(12) United States Patent
Onishi et al.

(10) Patent No.: US 11,066,302 B2
(45) Date of Patent: Jul. 20, 2021

(54) METHOD FOR PRODUCING INORGANIC OXIDE IN FORM OF THIN FILM

(71) Applicant: Kao Corporation, Tokyo (JP)

(72) Inventors: Ryo Onishi, Wakayama (JP); Tsuyoshi Oda, Wakayama (JP)

(73) Assignee: KAO CORPORATION, Tokyo (JP)

( * ) Notice: Subject to any disclaimer, the term of this patent is extended or adjusted under 35 U.S.C. 154(b) by 178 days.

(21) Appl. No.: 16/324,441

(22) PCT Filed: Aug. 8, 2017

(86) PCT No.: PCT/JP2017/028818
§ 371 (c)(1),
(2) Date: Feb. 8, 2019

(87) PCT Pub. No.: WO2018/030426
PCT Pub. Date: Feb. 15, 2018

(65) Prior Publication Data
US 2019/0367363 A1 Dec. 5, 2019

(30) Foreign Application Priority Data

Aug. 9, 2016 (JP) .............................. JP2016-156269
Mar. 14, 2017 (JP) .............................. JP2017-048592

(51) Int. Cl.
*C01B 13/32* (2006.01)
*C01G 23/04* (2006.01)
*C01G 25/02* (2006.01)

(52) U.S. Cl.
CPC ............ *C01B 13/326* (2013.01); *C01G 23/04* (2013.01); *C01G 25/02* (2013.01)

(58) Field of Classification Search
CPC ........ C01B 13/326; C01G 23/04; C01G 25/02
See application file for complete search history.

(56) References Cited

U.S. PATENT DOCUMENTS 9,127,331 B2    9/2015  Kuraki et al.
2006/0269695 A1  11/2006  Daly et al.
(Continued)

FOREIGN PATENT DOCUMENTS

CN    101177299 A    5/2008
CN    101293669 A    10/2008
(Continued)

OTHER PUBLICATIONS

International Preliminary Report on Patentability and English translation of the Written Opinion of the International Searching Authority for International Application No. PCT/JP2017/028817, dated Feb. 21, 2019.
(Continued)

*Primary Examiner* — James A Fiorito
(74) *Attorney, Agent, or Firm* — Birch, Stewart, Kolasch & Birch, LLP

(57) ABSTRACT

Provided is a method for producing an inorganic oxide in the form of a thin film, the method including a step of bringing a first liquid and a second liquid into contact with each other, the first liquid having an inorganic oxide precursor dissolved therein, the second liquid phase-separating from the first liquid and having a substance dissolved therein, the substance reacting with the inorganic oxide precursor of the first liquid to form an inorganic oxide derived from the inorganic oxide precursor. The segment size of the first liquid at the time of contact between the first and second liquids is 500 µm or smaller.

23 Claims, 24 Drawing Sheets

(56) References Cited

U.S. PATENT DOCUMENTS

| | | | |
|---|---|---|---|
| 2007/0292686 A1* | 12/2007 | Nagasawa | B82Y 30/00 |
| | | | 428/402 |
| 2009/0047518 A1 | 2/2009 | Sawada et al. | |
| 2009/0134356 A1* | 5/2009 | Ochiai | G03G 9/09708 |
| | | | 252/182.33 |
| 2010/0215988 A1 | 8/2010 | Daly et al. | |
| 2011/0089018 A1 | 4/2011 | Chang et al. | |
| 2012/0007020 A1 | 1/2012 | Tarascon et al. | |
| 2012/0108745 A1 | 5/2012 | Yamamoto | |
| 2012/0275991 A1 | 11/2012 | de Oliveira et al. | |
| 2014/0309416 A1 | 10/2014 | Teixeira et al. | |
| 2016/0002358 A1 | 1/2016 | Teixeira et al. | |
| 2018/0030554 A1 | 2/2018 | Teixeira et al. | |

FOREIGN PATENT DOCUMENTS

| | | |
|---|---|---|
| CN | 101505879 A | 8/2009 |
| CN | 101580275 A | 11/2009 |
| CN | 102616839 A | 8/2012 |
| CN | 102674454 A | 9/2012 |
| JP | 2001-261434 A | 9/2001 |
| JP | 2004-35303 A | 2/2004 |
| JP | 2004-224623 A | 8/2004 |
| JP | 2005-263551 A | 9/2005 |
| JP | 2008-202076 A | 9/2008 |
| JP | 4464171 B2 | 5/2010 |
| JP | 2012-506360 A | 3/2012 |
| JP | 2012-111684 A | 6/2012 |
| JP | 2012-193047 A | 10/2012 |
| JP | 2013-515603 A | 5/2013 |
| JP | 2014-84246 A | 5/2014 |
| KR | 10-2015-0027385 A | 3/2015 |
| WO | WO 2007/105524 A1 | 9/2007 |
| WO | WO 2012/147209 A1 | 11/2012 |
| WO | WO 2014/138100 A1 | 9/2014 |
| WO | WO 2016/027858 A1 | 2/2016 |

OTHER PUBLICATIONS

International Preliminary Report on Patentability and English translation of the Written Opinion of the International Searching Authority for International Application No. PCT/JP2017/028818, dated Feb. 21, 2019.

International Search Report for PCT/JP2017/028817 (PCT/ISA/210) dated Oct. 3, 2017.

Miao et al., "Synthesis of mesoporous TiO2 films in ionic liquid dissolving cellulose," Microporous and Mesoporous Materials, vol. 95, Nos. 1-3, Jun. 19, 2006, 2 pages, abstract provided only.

International Search Report (PCT/ISA/210) issued in PCT/JP2017/028818, dated Oct. 3, 2017.

Chu et al., "Progress of construction of micro-scale phase interfaces and preparation of novel functional materials with microfluids," Chemical Industry and Engineering Progress, vol. 33, No. 9, 2014, pp. 2229-2234, with English abstract.

Lan et al., "Controllable synthesis of microscale titania fibers and tubes using co-laminar micro-flows," Chemical Engineering Journal, vol. 181-182, 2012, pp. 828-833.

Li et al., "Ionic-liquid-assisted Growth of Flower-like $TiO_2$ Film on Ti Substrate with High Photocatalytic Activity," Journal of Molecular Catalysis A: Chemical, vol. 373, 2013 (Available online Mar. 14, 2013), pp. 12-17 (total 7 pages).

Miao et al., "Synthesis of Mesoporous $TiO_2$ Films in Ionic Liquid Dissolving Cellulose," Microporous and Mesoporous Materials, vol. 95, Nos. 1-3. Oct. 18, 2006 (Available online Jun. 19, 2006), pp. 26-30, (total 7 pages).

Nakashima et al., "Interfacial Synthesis of Hollow $TiO_2$ Microspheres in Ionic Liquids," Journal of the American Chemical Society, vol. 125, No. 21, 2003 (Publication date May 6, 2003), pp. 6386-6387 (total 6 pages).

Yan et al., "Structural Characterization of Nanocrystalline $TiO_2$ from Ionic Liquid-Water Solvent Mixture and Its Photocatalytic Activity," Acta Phys.—Chim. Sin., vol. 23, No. 7, Jul. 2007 (Published on Web: May 22, 2007), pp. 1032-1036 (total 29 pages), with machine translation.

* cited by examiner

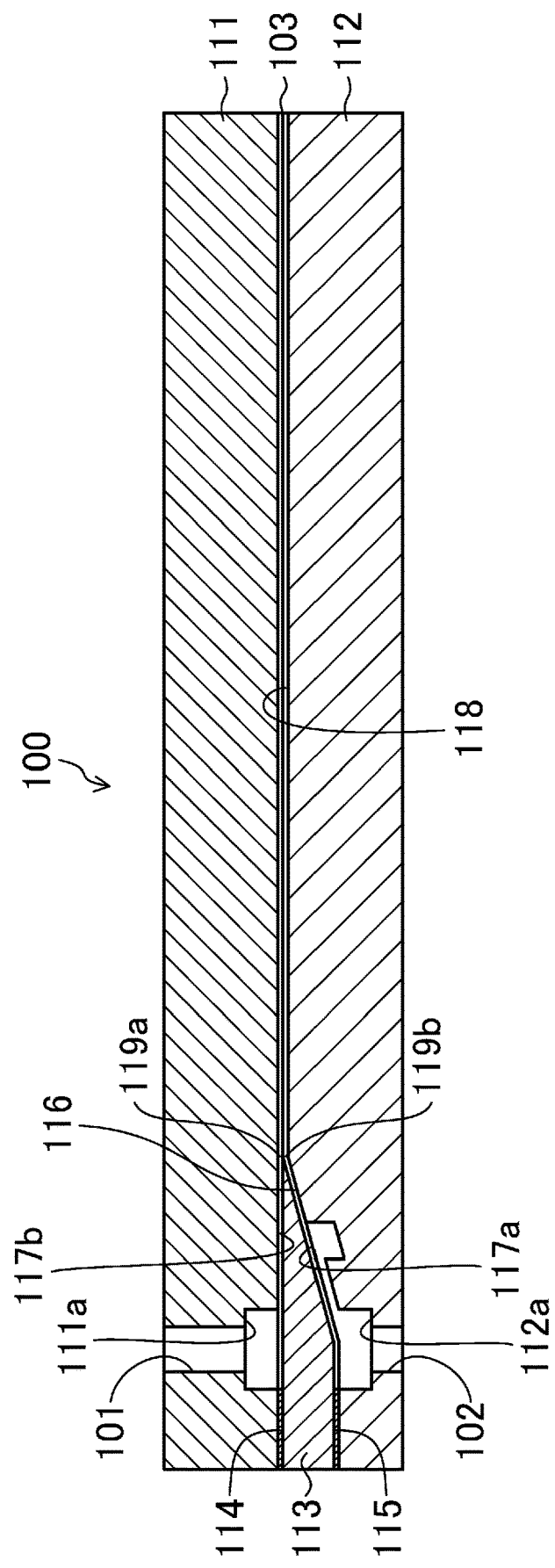

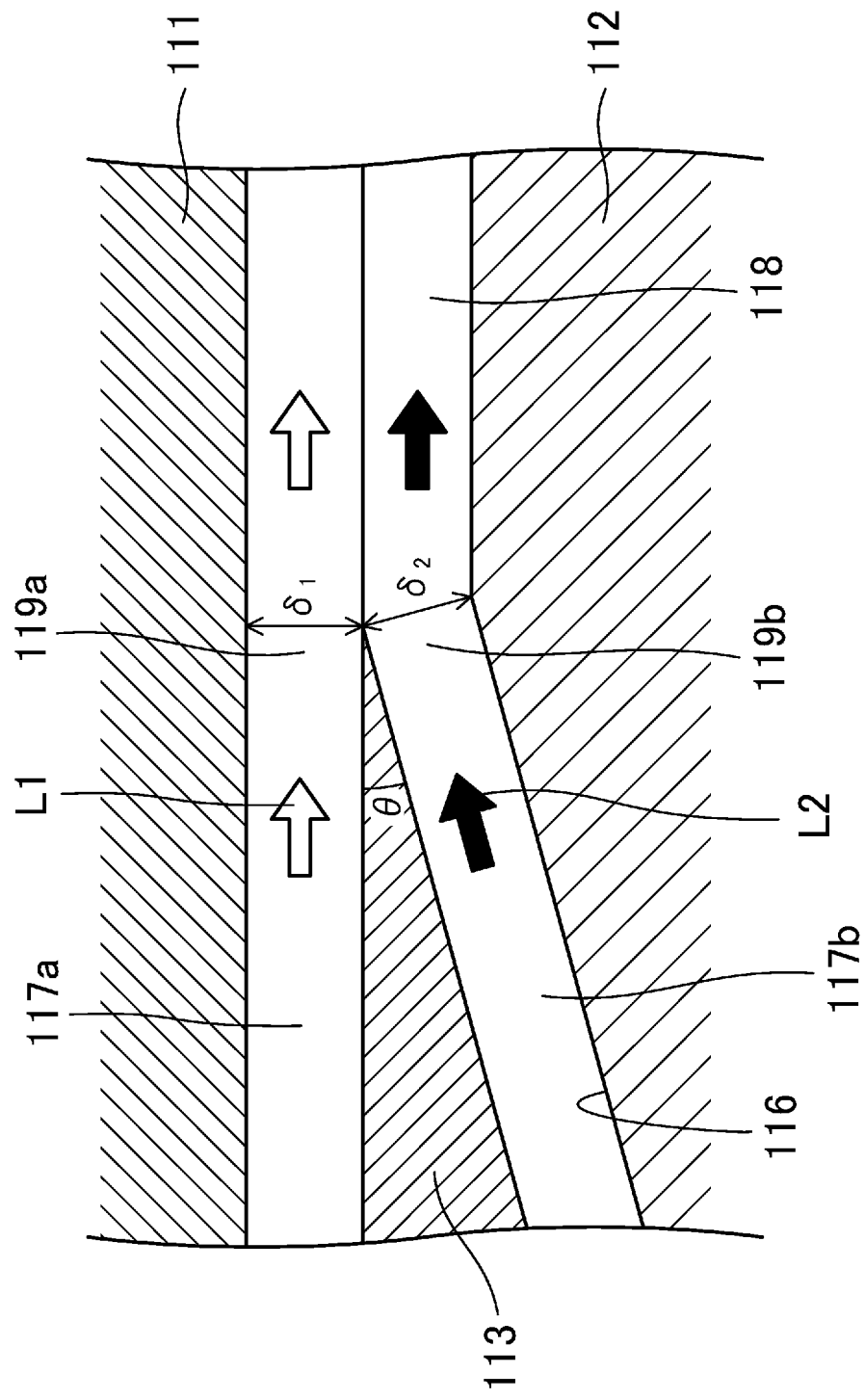

Example 1-1

Example 1-2

Example 1-3

Example 1-4

Example 1-5

Example 1-6

Example 1-7

Comparative Example 1-1

Comparative Example 1-2

Example 2-1

Example 2-2

Example 2-3

Example 3

METHOD FOR PRODUCING INORGANIC OXIDE IN FORM OF THIN FILM

TECHNICAL FIELD

The present invention relates to a method for producing an inorganic oxide in the form of a thin film.

BACKGROUND ART

Thin films of inorganic oxides, such as titanium oxide, silica, and alumina, have been widely used as, for example, materials of paints, ink, and coating materials, ultraviolet ray protective agents, and pearl pigments. As methods for producing such thin films, for example, a sol-gel process, CVD, sputtering, and laser ablation are generally known. Most of these methods are a method of forming a thin film on a substrate. For example, Patent Document 1 discloses a method in which a thin film is laminated by sputtering on a substrate to which a release agent is applied, and the thin film is peeled off from the substrate by using a solvent allowing the release agent to be dissolved therein. In contrast, as a method for producing a thin film without using a substrate, Patent Document 2 discloses a method in which a chemically-modified metal alkoxide is hydrolyzed and polymerized, and the resultant is dissolved in a solvent to prepare a solution, and the solution is added dropwise from a nozzle onto the surface of water flowing in a tank and developed, whereby a gel in the form of a thin film is formed, and subsequently the gel is collected, dried, and baked.

CITATION LIST

Patent Document

PATENT DOCUMENT 1: Japanese Unexamined Patent Publication No. 2008-202076
PATENT DOCUMENT 2: Japanese Patent No. 4464171

SUMMARY OF THE INVENTION

The present invention provides a method for producing an inorganic oxide in the form of a thin film, the method comprising a step of bringing a first liquid and a second liquid into contact with each other, the first liquid having an inorganic oxide precursor dissolved therein, the second liquid phase-separating from the first liquid and having a substance dissolved therein, the substance reacting with the inorganic oxide precursor of the first liquid to form an inorganic oxide derived from the inorganic oxide precursor, wherein the segment size of the first liquid at the time of contact between the first and second liquids is 500 μm or smaller.

BRIEF DESCRIPTION OF THE DRAWINGS

FIG. 11C is a cross-sectional view taken along a line XIC-XIC in FIG. 11A.

FIG. 11E is an enlarged longitudinal cross-sectional view of a portion including a first slit and a second slit.

DESCRIPTION OF EMBODIMENTS

Figure 1:
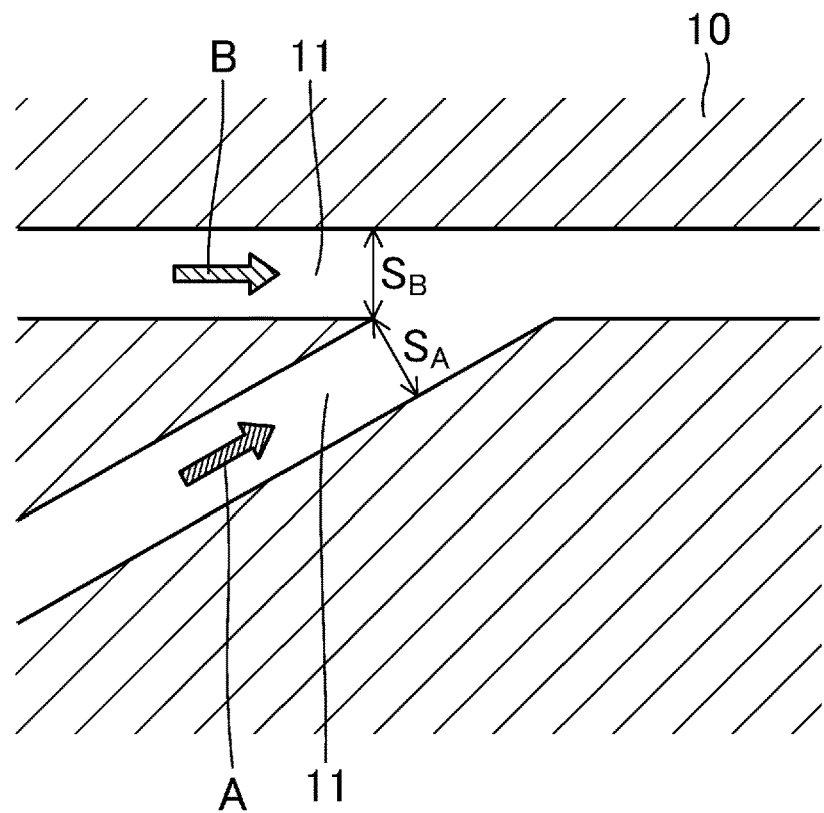
FIG. 1 is a diagram illustrating a first specific manner in which, in a mode of allowing at least one of the first liquid and the second liquid to flow and supplying and allowing the flowing one to have contact with the other, the one is supplied with the other.

Hereinafter, an embodiment will be described in detail.

A method for producing an inorganic oxide in the form of a thin film according to the embodiment includes an inorganic-oxide-formation step at which an inorganic oxide gel in the form of a thin film is formed by a step of bringing a first liquid and a second liquid into contact with each other, the first liquid having an inorganic oxide precursor dissolved therein, the second liquid phase-separating from the first liquid and having a substance dissolved therein, the substance (hereinafter, referred to as an inorganic-oxide-forming substance) reacting with the inorganic oxide precursor of the first liquid to form an inorganic oxide gel derived from the inorganic oxide precursor. At the inorganic-oxide-formation step, a slurry containing the inorganic oxide gel in the form of the thin film as a reaction product is obtained. The segment size $S_1$ of the first liquid at the time of contact between the first and second liquids is 500 µm or smaller.

A problem with the method for producing a thin film that Patent Document 1 discloses is that, since the thin film needs to be peeled from a substrate, production efficiency is considerably low. A problem with the method for producing a thin film that Patent Document 2 discloses is that, although a substrate is not required, since a solution prepared by dissolving a substance obtained by polymerizing a metal alkoxide is added dropwise onto the surface of water in a tank and developed, production efficiency is considerably low.

In contrast, in the method for producing the inorganic oxide in the form of the thin film according to the embodiment, at the time of contact between the first and second liquids, a gel of the inorganic oxide derived from the inorganic oxide precursor is formed at a contact interface between the first and second liquids, and at this time, the segment size $S_1$ of the first liquid is 500 µm or smaller, and accordingly, the inorganic oxide gel in the form of the thin film as a reaction product is continuously and stably formed with high selectivity, and thus, the inorganic oxide in the form of the thin film can be produced with high production efficiency. This is presumably because, in a microscopic-field in which the segment size $S_1$ of the first liquid serving as a source of the inorganic oxide is 500 µm or smaller, at the contact interface between the first and second liquids, a reaction rate at which the inorganic oxide precursor reacts with the inorganic-oxide-forming substance to form a gel of the inorganic oxide is suitable for two-dimensional growth of the gel. Furthermore, the method for producing the inorganic oxide in the form of the thin film according to the embodiment enables the production of an inorganic oxide in the form of a thin film with excellent uniformity in the thicknesses of thin films.

The term "segment size at the time of contact between the first and second liquids" used in the present application refers to the minimum linear diameter, passing through the center of gravity of a cross-section of the first liquid or the second liquid, of the cross-section perpendicular to the flow direction of the first or second liquid, in a state in which a gel in the form of a thin film is allowed to be formed by the contact between the first and second liquids. In other words, although an infinite number of straight lines passes through the center of gravity of a cross-section of the first liquid or the second liquid, the term "segment size" used in the present application refers to the minimum linear diameter among the infinite number of the linear diameters. The term "phase-separate" used in the present application refers to a state in which, when the first and second liquids are brought into contact with each other, liquid-liquid phase separation is visually observed, and also the term includes a case in which the first and second liquids are compatible with each other to some extent.

The first liquid is a solution having the inorganic oxide precursor dissolved therein, and phase-separates from the second liquid.

Examples of the inorganic oxide precursor include inorganic substances each having a hydrolyzable functional group from which an inorganic oxide, such as titanium oxide, zirconium oxide, yttrium oxide, silica, or alumina, is derived by sol-gel transition accompanied by a hydrolysis reaction and a polycondensation reaction. Examples of the inorganic oxide precursor include alkoxides, halides, salts and coordination compounds (complexes) each having a hydrolyzable functional group, such as a carboxyl group or β-diketone, and amines of the above-mentioned inorganic oxides. As the inorganic oxide precursor, one or two or more of the above-mentioned inorganic oxide precursors are suitably used. From the viewpoint of producing the inorganic oxide in the form of the thin film with high production efficiency, the inorganic oxide precursor is more suitably an alkoxide, still more suitably a metal alkoxide, still further more suitably a titanium alkoxide and a zirconium alkoxide each having high reactivity, still further more suitably a titanium alkoxide and a zirconium alkoxide each having an alkyl group having 2 to 4, inclusive, carbon atoms.

Examples of the titanium alkoxide include tetraethyl orthotitanate, tetraisopropyl orthotitanate, and tetra-n-butyl orthotitanate (hereinafter, referred to as "Ti(OBu)$_4$"). Examples of the zirconium alkoxide include tetraethyl orthozirconate, tetraisopropyl orthozirconate, and tetra-n-butyl orthozirconate (hereinafter, referred to as "Zr(OBu)$_4$").

From the viewpoint of producing the inorganic oxide in the form of the thin film with high production efficiency, the inorganic oxide precursor content $c_1$ of the first liquid is suitably 1% by mass or more, more suitably 5% by mass or more, still more suitably 8% by mass or more, and from the viewpoint of forming the thin film with high selectivity and thereby producing the inorganic oxide in the form of the thin film with high production efficiency, suitably 80% by mass or less, more suitably 70% by mass or less, still more suitably 60% by mass or less, still further more suitably 50% by mass or less, still further more suitably 40% by mass or less. The inorganic oxide precursor content $c_1$ of the first liquid is suitably 1% by mass or more and 80% by mass or less, more suitably 5% by mass or more and 70% by mass or less, still more suitably 8% by mass or more and 60% by mass or less, still further more suitably 8% by mass or more and 50% by mass or less, still further more suitably 8% by mass or more and 40% by mass or less.

Examples of a solvent of the first liquid include solvents capable of dissolving the inorganic oxide precursor, for example, hydrocarbon solvents such as toluene, hexane, heptane, and benzene, and chloroform. As the solvent of the first liquid, one or two or more of the above-mentioned solvents are suitably used. From the viewpoint of producing the inorganic oxide in the form of the thin film with high production efficiency, the solvent of the first liquid is more suitably toluene, hexane, or heptane.

The first liquid may contain other additives without losing the effect of producing the inorganic oxide in the form of the thin film with high production efficiency. From the viewpoint of hydrolysis rate control, the first liquid may contain, for example, an acid, a base, or a chelating agent. Examples of the acid include inorganic acids, such as nitric acid, sulfuric acid, and hydrochloric acid; and organic acids, such as acetic acid, oxalic acid, formic acid, glycolic acid, gluconic acid, lactic acid, tartaric acid, citric acid, malic acid, and succinic acid. Examples of the base include an ammonia solution, and triethanolamine. Examples of the chelating agent include acetylacetone, methyl acetoacetate, ethyl acetoacetate, n-propyl acetoacetate, and isopropyl acetoacetate. The first liquid may contain an inorganic-oxide-forming substance, such as water, without losing the effect of producing the inorganic oxide in the form of the thin film with high production efficiency.

The second liquid is a solution having inorganic-oxide-forming substance dissolved therein, and phase-separates from the first liquid.

In the case where the inorganic oxide precursor is an inorganic substance having a hydrolyzable functional group from which an inorganic oxide, such as a metal alkoxide, is derived, typical examples of the inorganic-oxide-forming substance include water. Only one inorganic-oxide-forming substance may be used, or two or more inorganic-oxide-forming substances may be used.

From the viewpoint of producing the inorganic oxide in the form of the thin film with high production efficiency, the inorganic-oxide-forming substance content $c_2$ of the second liquid is suitably 0.1% by mass or more, more suitably 0.5% by mass or more, still more suitably 0.8% by mass or more, still further more suitably 1% by mass or more, still further more suitably 5% by mass or more, and, from the viewpoint of forming a thin film with high selectivity and thereby producing the inorganic oxide in the form of the thin film with high production efficiency, suitably 70% by mass or less, more suitably 30% by mass or less, still more suitably 20% by mass or less, still further more suitably 15% by mass or less, still further more suitably 12% by mass or less. This inorganic-oxide-forming substance content $c_2$ of the second liquid is suitably 0.1% by mass or more and 70% by mass or less, more suitably 0.5% by mass or more and 30% by mass or less, still more suitably 0.8% by mass or more and 20% by mass or less, still further more suitably 1% by mass or more and 15% by mass or less, still further more suitably 5% by mass or more and 12% by mass or less.

The inorganic oxide precursor content $c_1$ of the first liquid may be equal to the inorganic-oxide-forming substance content $c_2$ of the second liquid, may be higher than the inorganic-oxide-forming substance content $c_2$ of the second liquid, or may be lower than the inorganic-oxide-forming substance content $c_2$ of the second liquid.

Examples of a solvent of the second liquid include what are called ionic liquids, and organic solvents, such as acetonitrile and dimethyl sulfoxide. As the solvent of the second liquid, one or two or more of the above-mentioned solvents are suitably used, and ionic liquids are more suitably used. The term "ionic liquid" used in the present application refers to a salt in the form of a liquid at a temperature of 100° C. or lower under atmospheric pressures.

Examples of cations of the ionic liquid include ammonium cations and phosphonium cations.

Examples of the ammonium cations include 1-alkyl-3-alkylimidazolium cations of the following Formula (1). Note that $R^1$ and $R^2$ are suitably not identical to each other.

[Formula 1-1]

(1)

(where $R^1$ is an alkyl group having 12 or less carbon atoms, or a functional group in which one or two or more oxygen atoms are introduced between carbon atomic bonds of an alkyl group so as to form an ether linkage and the total of the number of the carbon atoms and the number of the oxygen atoms is 12 or less; and $R^2$ is an alkyl group having 1 to 4, inclusive, carbon atoms, or a hydrogen atom.)

The 1-alkyl-3-alkylimidazolium cations of the above-mentioned Formula (1) are suitably 1-alkyl-3-methylimidazolium cations, more suitably 1-methyl-3-methylimidazolium cations, 1-ethyl-3-methylimidazolium cations (hereinafter, referred to as "Emim"), 1-propyl-3-methylimidazolium cations, and 1-butyl-3-methylimidazolium cations (hereinafter, referred to as "Bmim").

Examples of the ammonium cations include N-alkylpyridium cations of the following Formula (2).

[Formula 2-1]

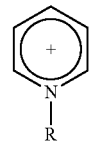

(2)

(where R is an alkyl group having 12 or less carbon atoms, or a functional group in which one or two or more oxygen atoms are introduced between carbon atomic bonds of an alkyl group so as to form an ether linkage, and the total of the number of the carbon atoms and the number of the oxygen atoms is 12 or less.)

The N-alkylpyridium cations of the above-mentioned Formula (2) are suitably 1-methylpyridium cations, 1-ethylpyridium cations, 1-propylpyridium cations, and 1-butylpyridium cations.

Examples of the ammonium cations include cations of the following Formula (3).

$[NR_xH_{4-x}]^+$ (3)

(where R is an alkyl group having 12 or less carbon atoms, or a functional group in which one or two or more oxygen atoms are introduced between carbon atomic bonds of an alkyl group so as to form an ether linkage, and the total of the number of the carbon atoms and the number of the oxygen atoms is 12 or less; and X is an integer of 0 to 4 inclusive.)

The ammonium cations of the above-mentioned Formula (3) are suitably N,N,N-triethyl-N-propylammonium cations, tetramethylammonium cations, tetraethylammonium cations, and ethyldimethylpropylammonium cations.

Examples of the phosphonium cations include cations of the following Formula (4).

$$[PR_xH_{4-x}]^+ \qquad (4)$$

(where R is an alkyl group having 12 or less carbon atoms, or a functional group in which one or two or more oxygen atoms are introduced between carbon atomic bonds of an alkyl group so as to form an ether linkage, and the total of the number of the carbon atoms and the number of the oxygen atoms is 12 or less; and X is an integer of 0 to 4 inclusive).

The phosphonium cations of the above-mentioned Formula (4) are suitably tetramethylphosphonium cations, tetraethylphosphonium cations, and tributylmethylphosphonium cations.

Examples of anions of the ionic liquid include bis(trifluoromethylsulfonyl)amide anions ($[(CF_3SO_2)_2N]^-$) (hereinafter, also referred to as "NTf2"), ethyl sulfate anions ($[C_2H_5OSO_3]^-$) (hereinafter, also referred to as "ES"), bis (fluorosulfonyl)amide anions ($[(FSO_2)_2N]^-$), dicyanamide anions ($[(CN)_2N]^-$), tetrafluoroborate anions ($BF_4^-$), hexafluorophosphate anions ($PF_6^-$), halide anions ($Cl^-$, $Br^-$, $I^-$), and trifluoromethanesulfonate anions ($[CF_3SO_3]^-$).

As the ionic liquid serving as the solvent of the second liquid, one or two or more of combinations of these cations and anions are suitably used.

The second liquid may contain other additives without losing the effect of producing the inorganic oxide in the form of the thin film with high production efficiency.

In the mode of contact between the first and second liquids, the first liquid having a segment size $S_1$ of 500 µm or smaller is brought into contact with the second liquid. At this time, a fixed amount of the first liquid is brought in contact with the second liquid, and thus the inorganic-oxide-formation step may be performed by batch operation. However, from the viewpoint of achieving high production efficiency, it is suitable that only one or both of the first and second liquids are moved, and the inorganic-oxide-formation step is performed by continuous operation. The term "continuous operation" used in the present application refers to an operation in which, at the inorganic-oxide-formation step performed by a step of bringing the first liquid and the second liquid into contact with each other, the first liquid and the second liquid are continuously or intermittently brought into continual contact with each other while the inorganic oxide in the form of the thin film as a reaction product is continually collected.

The mode of contact between the first and second liquids in which the inorganic-oxide-formation step is performed by continuous operation includes a mode of supplying moving one with the other to bring them into contact with each other, and a mode of supplying staying-still one with the other to bring them into contact with each other while moving the other. The mode of supplying moving one with the other to bring them into contact with each other includes a mode of supplying one flowing by an external force with the other to bring them into contact with each other and a mode of supplying one transported without an external force with the other to bring them into contact with each other. Furthermore, the mode of supplying flowing one with the other to bring them into contact with each other includes a mode of allowing both of the first and second liquids to flow, that is, a mode of allowing the first and second liquids to flow separately and then join together, and a mode of allowing only one of the first and second liquids to flow.

Examples of the mode of allowing both of the first and second liquids to flow and supplying flowing one with the other to bring the liquids into contact with each other include a mode of causing one of the first and second liquids to be joined by the other from behind at an angle with respect to the flow direction of the one to bring the liquids into contact with each other, and then, allowing the liquids to flow in the flow direction of the one; a mode of allowing both of the first and second liquids to flow in the same direction, and while maintaining the flow direction, causing the first and second liquids to join together to bring the liquids into contact with each other; a mode of causing one of the first and second liquids to be joined by the other from the front at an angle with respect to the flow direction of the one to bring the liquids into contact with each other, and then, allowing the liquids to flow in the flow direction of the one; a mode of causing one of the first and second liquids to be joined by the other from a direction perpendicular to the flow direction of the one to bring the liquids into contact with each other, and then, allowing the liquids to flow in the flow direction of the one; and a mode of causing the first and second liquids to face and join together to bring the liquids into contact with each other, and then allowing the liquids to flow in a direction (for example, an orthogonal direction) different from the flow direction of the first and second liquids. Alternatively, there may be adopted a mode of allowing both of the first and second liquids to flow and bringing the first and second liquids into contact with each other so as to cover one of the first and second liquids with the other, thus allowing the whole circumference of the one along a direction perpendicular to the flow direction of the one to have contact with the other.

From the viewpoint of forming a thin film with high selectivity and thereby obtaining an inorganic oxide in the form of a thin film with high production efficiency, the mode of allowing both of the first and second liquids to flow and supplying flowing one with the other to bring the liquids into contact with each other is suitably a mode of allowing one of the first and second liquids to have contact with the other from behind at an angle with respect to the flow direction of the one, and then allowing the liquids to flow in the flow direction of the other; or a mode of allowing both of the first and second liquids to flow in the same direction, and bringing the first and second liquids into contact with each other while maintaining the flow direction. In the former mode, from the viewpoint of forming a thin film with high selectivity and thereby obtaining an inorganic oxide in the form of the thin film with high production efficiency, the mode is suitably similar to a mode of allowing the first and second liquids to flow in parallel and come into contact with each other. Hence, an angle θ which the flow direction of one liquid forms with the flow direction of the other liquid is suitably 90° or less, more suitably 60° or less, still more suitably 45° or less.

Examples of the mode of allowing only one of the first and second liquids to flow and supplying the flowing one with the other to bring the liquids into contact with each other include a mode of supplying one of the first and second liquids with the other from behind at an angle with respect to the flow direction of the one to bring the liquids into contact with each other, and then allowing the liquids to flow in the flow direction of the one; a mode of supplying one of the first and second liquids with the other from the front at an angle with respect to the flow direction of the one to bring the liquids into contact with each other, and then allowing the liquids to flow in the flow direction of the one; and a mode of supplying one of the first and second liquids with the other from a direction perpendicular to the flow direction of the one to bring the liquids into contact with each other, and subsequently allowing the liquids to flow in the flow direction of the one. Alternatively, there may be adopted a mode of allowing only one of the first and second liquids to flow and bringing the first and second liquids into contact with each other so as to cover the flowing one with the other, thus allowing the whole circumference of the one in a direction perpendicular to the flow direction of the one to have contact with the other.

In the mode of allowing at least one of the first and second liquids to flow and supplying the flowing one with the other to bring the liquids into contact with each other, examples of a first specific manner of supplying the one with the other include a manner of, as illustrated in FIG. 1, allowing one A of the first and second liquids and the other B to flow out from the openings of slits of a passage 11 inside a reactor 10 and join together. Here, the segment size $S_A$ of one A and the segment size $S_B$ of the other B in a state in which a gel in the form of a thin film can be formed by the contact between the first and second liquids are respectively equivalent to the widths of the openings into the confluence portion in directions perpendicular to the respective flow directions in the passage 11. In this manner, the duration of contact between the first and second liquids can be controlled by the flow rates of the first and second liquids. Furthermore, one or both of the first and second liquids may be composed of a plurality of liquids. Note that an inorganic oxide to be produced can be collected at a point downstream from the confluence portion of the first and second liquids.

Figure 2:
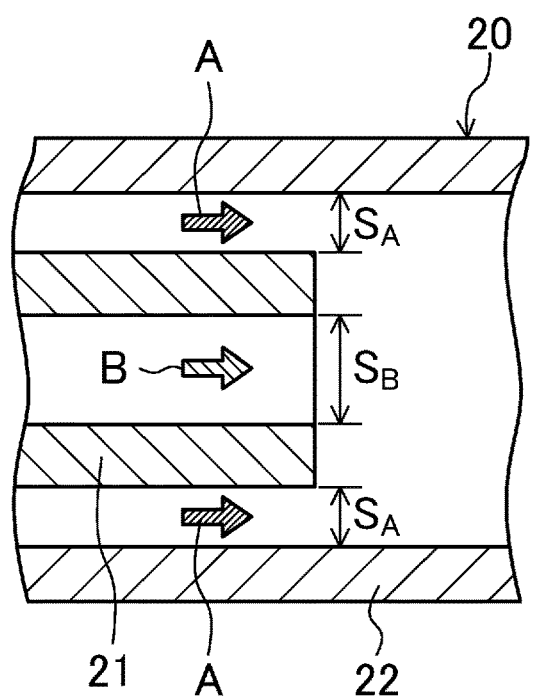
FIG. 2 is a diagram illustrating a second specific manner in which, in a mode of allowing least one of the first liquid and the second liquid to flow and supplying and allowing the flowing one to have contact with the other, the one is supplied with the other.

Examples of a second specific manner of supplying one of the first and second liquids with the other include a manner of, as illustrated in FIG. 2, allowing one A of the first and second liquids to flow between an inner pipe 21 and an outer pipe 22 of a double pipe reactor 20 while allowing the other B to flow through the inner pipe 21, and causing the liquids to join together so as to cover the other B with the one A. Here, the segment size $S_A$ of the one A in a state in which a gel in the form of a thin film can be formed by the contact between the first and second liquids is equivalent to the diameter of opening into the confluence portion in a direction perpendicular to the flow direction of the one A, that is, half of the difference between the inner diameter of the outer pipe 22 and the outer diameter of the inner pipe 21. The segment size $S_B$ of the other B is equivalent to the diameter of opening into the confluence portion in a direction perpendicular to the flow direction of the other B, that is, the inner diameter of the inner pipe 21 from which the other B flows out. In this case, it is suitable that the second liquid is allowed to flow between the inner pipe 21 and the outer pipe 22, while the first liquid is allowed to flow through the inner pipe 21. In this manner, the duration of contact between the first and second liquids can be controlled by the flow rates of the first and second liquids. Furthermore, one or both of the first and second liquids may be composed of a plurality of liquids. Note that an inorganic oxide to be produced can be collected at a point downstream from the confluence portion of the first and second liquids.

Figure 3A:
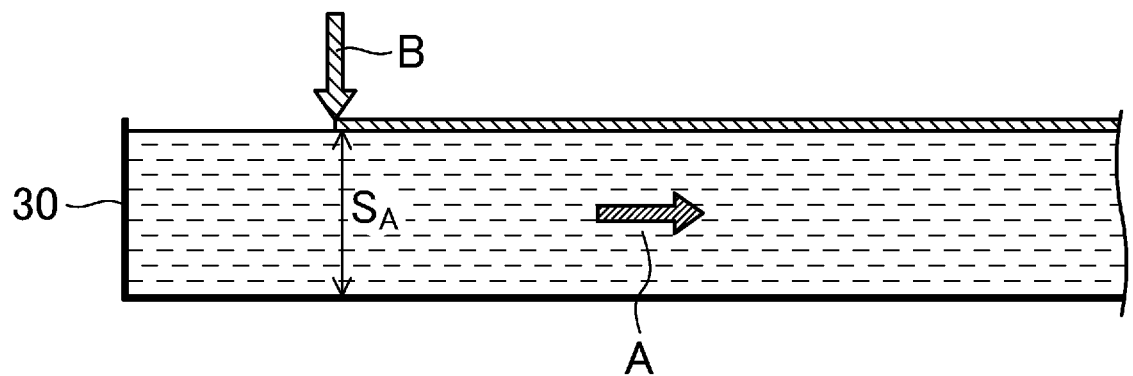
FIG. 3A is a diagram illustrating a third specific manner in which, in a mode of allowing at least one of the first liquid and the second liquid to flow and supplying and allowing the flowing one to have contact with the other, the one is supplied with the other.
Figure 3B:
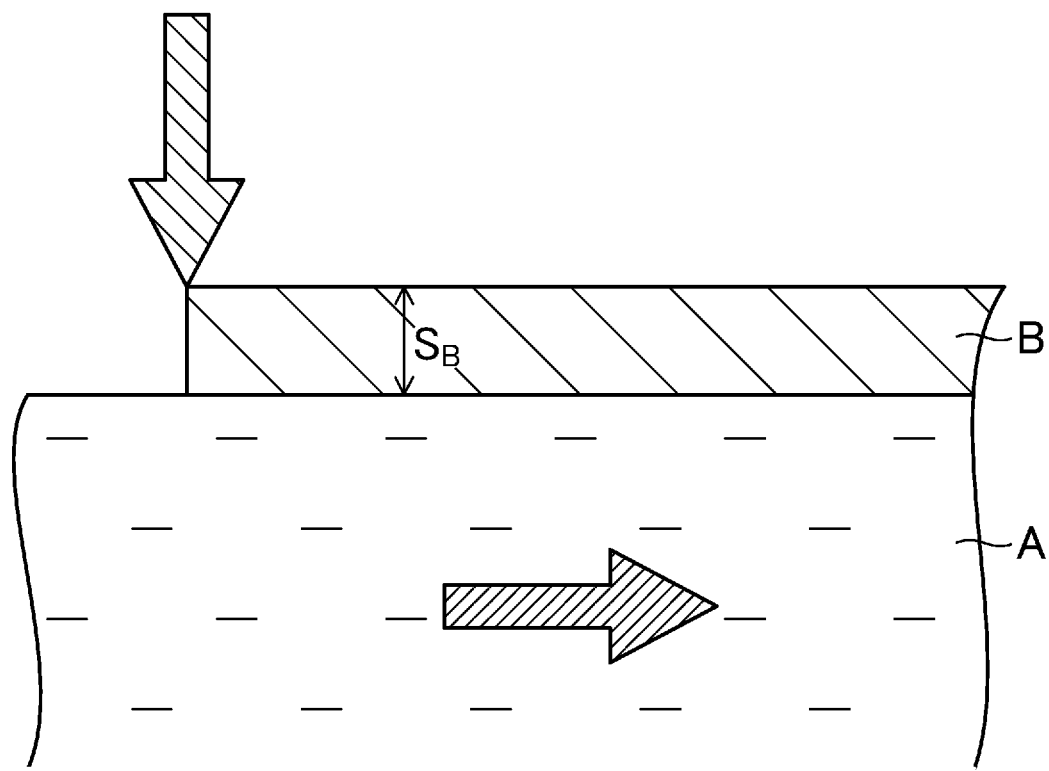
FIG. 3B is an enlarged cross-sectional view of surface layers of one and the other of the first and second liquids in the mode of contact illustrated in FIG. 3A.

Examples of a third specific manner of supplying one of the first and second liquids with the other include a manner of, as illustrated in FIGS. 3A and 3B, allowing one A of the first and second liquids to flow in a liquid tank 30, and supplying the other B to a surface of the one A. Here, the segment size $S_A$ of the one A and the segment size $S_B$ of the other B in a state in which a gel in the form of a thin film can be formed by the contact between the first and second liquids are respectively equivalent to layer thicknesses at the cross-sections perpendicular to the flow directions of the liquids in a state in which a liquid laminated structure is formed by supplying the other B onto the surface of the flowing one A. In this case, the second liquid is suitably allowed to flow in the liquid tank 30. In this manner, the duration of contact between the first and second liquids can be controlled by the flow rate of the one A. Furthermore, one or both of the first and second liquids may be composed of a plurality of liquids. Examples of a unit for supplying the other B include a unit configured to allow the other B to flow out of the opening of a slit of a nozzle, a unit configured to drop droplets of the other B from a nozzle or a showerhead, and a unit configured to cause the other B exposed to the opening of a coating die to be entrained in the flow of the one A. Furthermore, the unit for supplying the other B may be configured to be movably provided so that a position for supplying the other B to the one A can be changed. Note that an inorganic oxide to be produced can be collected at a downstream portion of the liquid tank 30.

Figure 4A:
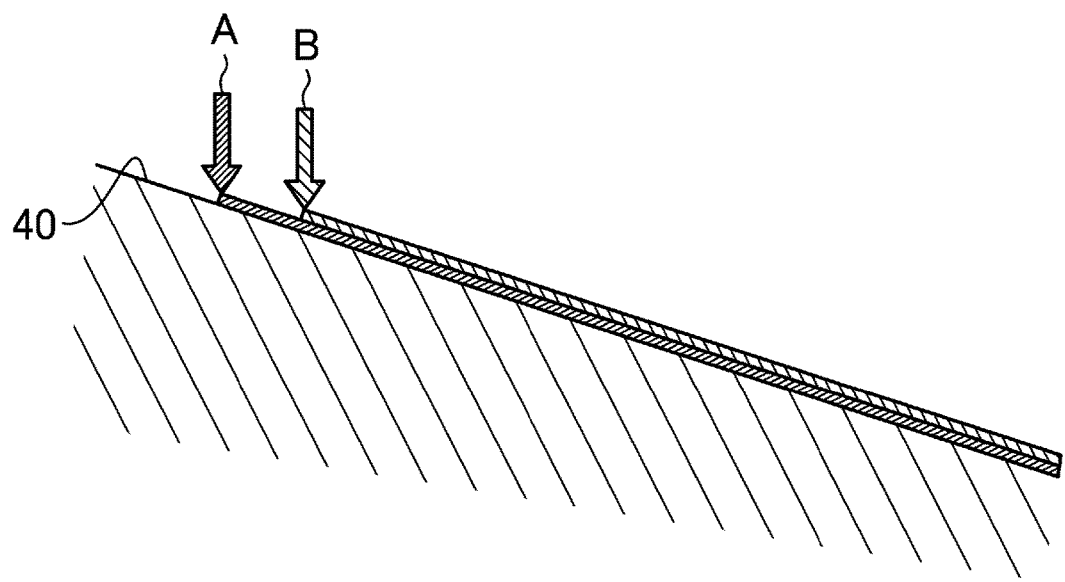
FIG. 4A is a diagram illustrating a fourth specific manner in which, in a mode of allowing at least one of the first liquid and the second liquid to flow and supplying and allowing the flowing one to have contact with the other, the one is supplied with the other.
Figure 4B:
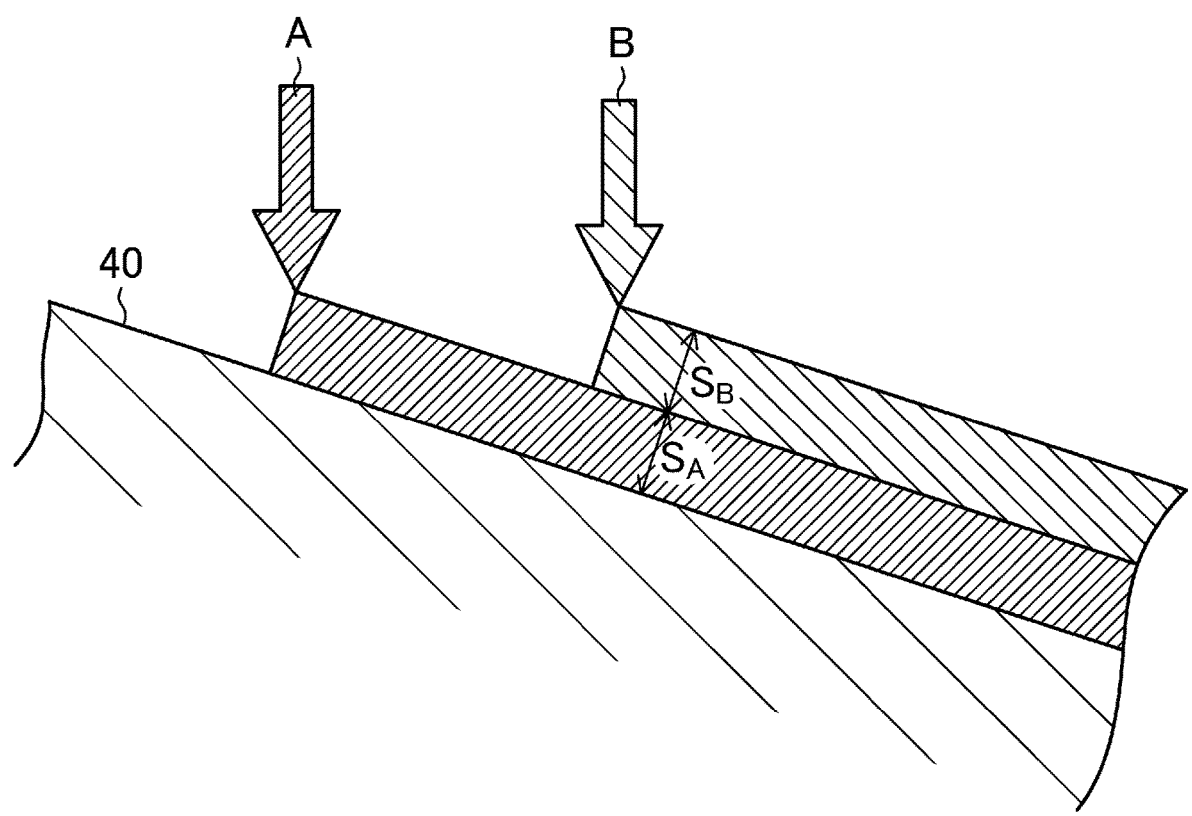
FIG. 4B is an enlarged cross-sectional view of one and the other of the first and second liquids in the mode of contact illustrated in FIG. 4A.

Examples of a fourth specific manner for supplying one of the first and second liquids with the other include a manner of, as illustrated in FIGS. 4A and 4B, supplying one A of the first and second liquids to a slope 40 to allow the one A to flow under its own weight, and supplying the other B onto a surface of the one A to form a liquid laminated structure. Here, the segment size $S_A$ of the one A and the segment size $S_B$ of the other B in a state in which a gel in the form of a thin film can be formed by the contact between the first and second liquids are respectively equivalent to layer thicknesses at the cross-sections perpendicular to the flow directions of the liquids in a state in which a liquid laminated structure is formed by supplying the other B onto the surface of the flowing one A. In this case, the second liquid is suitably allowed to flow on the slope 40. The slope 40 suitably has a small contact angle with the one A and has high wettability. In this manner, the duration of contact between the first and second liquids can be controlled by the flow rate of the one A and an angle of inclination of the slope 50. Furthermore, one or both of the first and second liquids may be composed of a plurality of liquids. Examples of a unit for supplying the one A include a unit configured to allow the one A to flow out of the opening of a slit of a nozzle. Furthermore, the unit for supplying the one A may be configured to be movably provided so that a position for supplying the one A onto the slope 40 can be changed. Examples of a unit for supplying the other B include a unit configured to allow the other B to flow out of the opening of a slit of a nozzle, a unit configured to drop droplets of the other B from a nozzle or a showerhead, and a unit configured to cause the other B exposed to the opening of a coating die to be entrained in the flow of the one A. Furthermore, the unit for supplying the other B may be configured to be movably provided so that a position for supplying the other B to the one A can be changed. The units for supplying the one A and the other B respectively may be composed of a single component. Note that an inorganic oxide to be produced can be collected at a downstream portion of the slope 40.

Figure 5A:
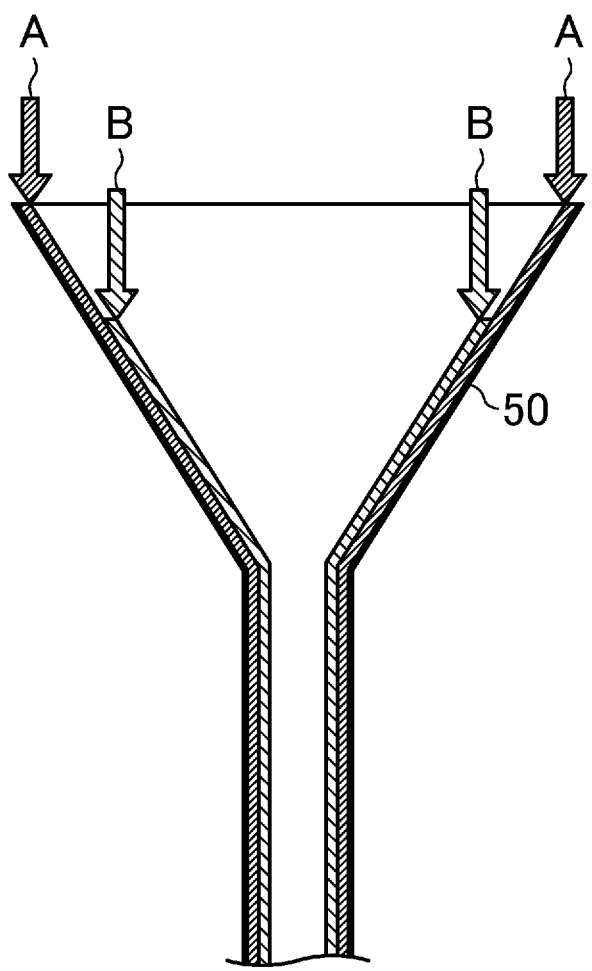
FIG. 5A is a diagram illustrating a fifth specific manner in which, in a mode of allowing at least one of the first liquid and the second liquid to flow and supplying and allowing the flowing one to have contact with the other, the one is supplied with the other.
Figure 5B:
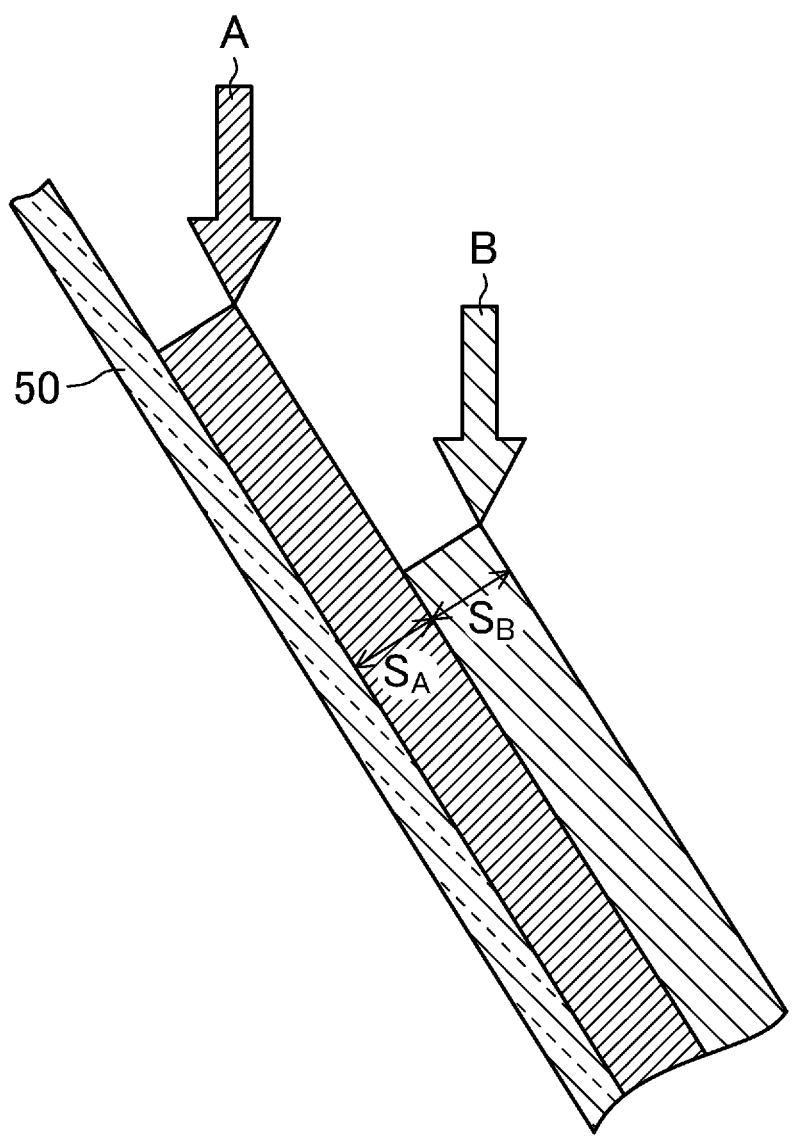
FIG. 5B is an enlarged cross-sectional view of one and the other of the first and second liquids in the mode of contact illustrated in FIG. 5A.

Examples of a fifth specific manner of supplying one of the first and second liquids with the other include a manner of, as illustrated in FIGS. 5A and 5B, supplying one A of the first and second liquids onto a wall of a funnel 50 to allow the one A to flow under its own weight, and supplying the other B onto a surface of the one A to form a liquid laminated structure. Here, the segment size $S_A$ of the one A and the segment size $S_B$ of the other B in a state in which a gel in the form of a thin film can be formed by the contact between the first and second liquids are respectively equivalent to layer thicknesses at the cross-sections perpendicular to the flow directions of the liquids in a state in which a liquid laminated structure is formed by supplying the other B onto the surface of the flowing one A. In this case, the second liquid is suitably allowed to flow on the wall of the funnel 50. In this manner, the duration of contact between the first and second liquids can be controlled by the flow rate of the one A and an angle of inclination of the wall of the funnel 50. Furthermore, one or both of the first and second liquids may be composed of a plurality of liquids. Examples of a unit for supplying the one A include a unit configured to allow the one A to flow out of the opening of a slit of a nozzle. Furthermore, the unit for supplying the one A may be configured to be movably provided so that a position for supplying the one A to the funnel 50 can be changed. Examples of a unit for supplying the other B include a unit configured to allow the other B to flow out of the opening of a nozzle, and a unit configured to drop droplets of the other B from a nozzle or a showerhead. Furthermore, the unit for supplying the other B may be configured to be movably provided so that a position for supplying the other B to the one A can be changed. The units for supplying the one A and the other B respectively may be composed of a single component. Note that an inorganic oxide to be produced can be collected at a downstream portion of the funnel 50.

Examples of the mode of supplying transported one of the first and second liquids with the other to bring the liquids into contact with each other include: a mode of allowing one of the first and second liquids to have contact with the other from behind at an angle with respect to the transport direction of the one, and then transporting the liquids in the transport direction of the one; a mode of allowing one of the first and second liquids to have contact with the other from the front at an angle with respect to the transport direction of the one, and then transporting the liquids in the transport direction of the one; and a mode of allowing one of the first and second liquids to have contact with the other from a direction perpendicular to the transport direction of the one, and then transporting the liquids in the transport direction of the one.

Figure 6A:
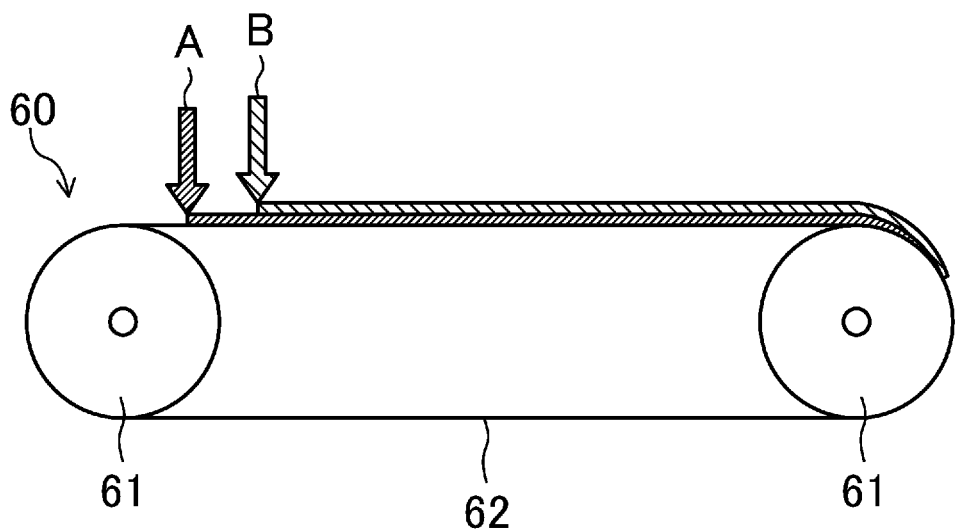
FIG. 6A is a diagram illustrating a specific manner in which, in a mode of supplying and allowing one of the first liquid and the second liquid to be transported to have contact with the other, the one is supplied with the other.
Figure 6B:
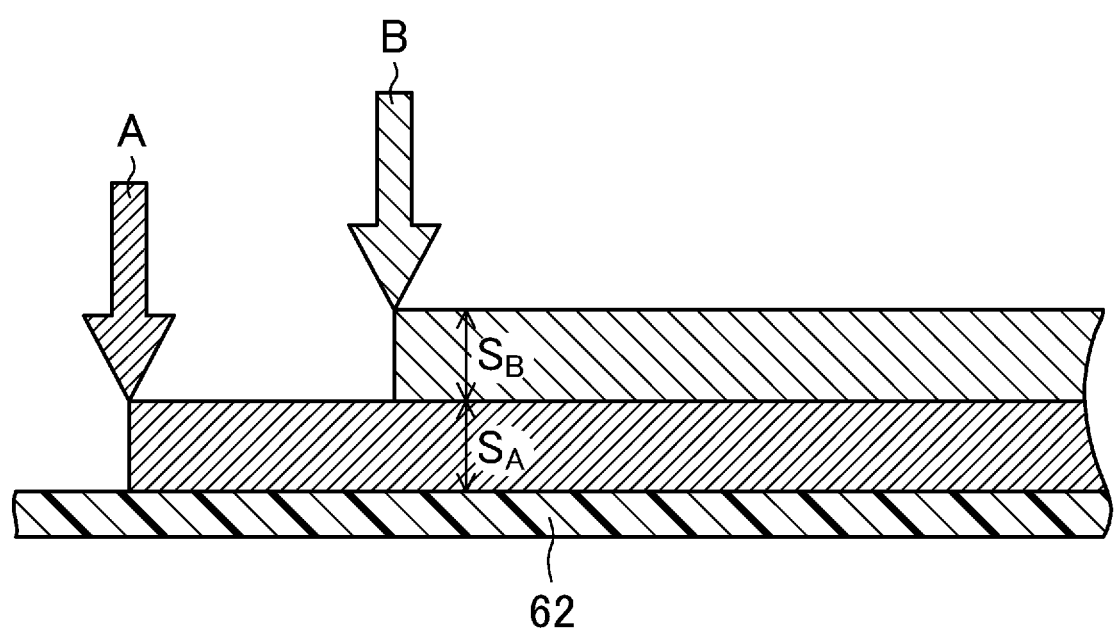
FIG. 6B is an enlarged cross-sectional view of one and the other of the first and second liquids in the mode of contact illustrated in FIG. 6A.

In the mode of supplying transported one of the first and second liquids with the other to bring the liquids into contact with each other, examples of a specific manner of supplying the one with the other include a manner of, as illustrated in FIGS. 6A and 6B, by a belt-conveyor system 60, supplying one A of the first and second liquids onto a conveyor belt 62 that moves while being wound around a pair of rollers 61, and thus transporting the one A, and supplying a surface of the one A with the other B to form a liquid laminated structure. Here, the segment size $S_A$ of the one A and the segment size $S_B$ of the other B in a state in which a gel in the form of a thin film can be formed by the contact between the first and second liquids are respectively equivalent to layer thicknesses at the cross-sections perpendicular to the flow directions of the liquids in a state in which a liquid laminated structure is formed by supplying the other B onto the surface of the transported one A. In this case, the second liquid is suitably supplied onto the conveyor belt 62 and thereby transported. In this manner, the duration of contact between the first and second liquids can be controlled by the transport speed of the conveyor belt 62. Furthermore, one or both of the first and second liquids may be composed of a plurality of liquids. Examples of a unit for supplying the one A include a unit configured to allow the one A to flow out of the opening of a slit of a nozzle. Furthermore, the unit for supplying the one A may be configured to be movably provided so that a position for supplying the one A onto the conveyor belt 62 can be changed. Examples of a unit for supplying the other B include a unit configured to allow the other B to flow out of the opening of a slit of a nozzle, a unit configured to drop droplets of the other B from a nozzle or a showerhead, and a unit configured to cause the other B exposed to the opening of a coating die to be entrained in the transported one A. Furthermore, the unit for supplying the other B may be configured to be movably provided so that a position for supplying the other B to the one A can be changed. The unit for supplying the one A and the unit for supplying the other B may be each composed of a single component. Note that an inorganic oxide to be produced can be collected at a downstream portion of the conveyor belt 62.

Figure 7A:
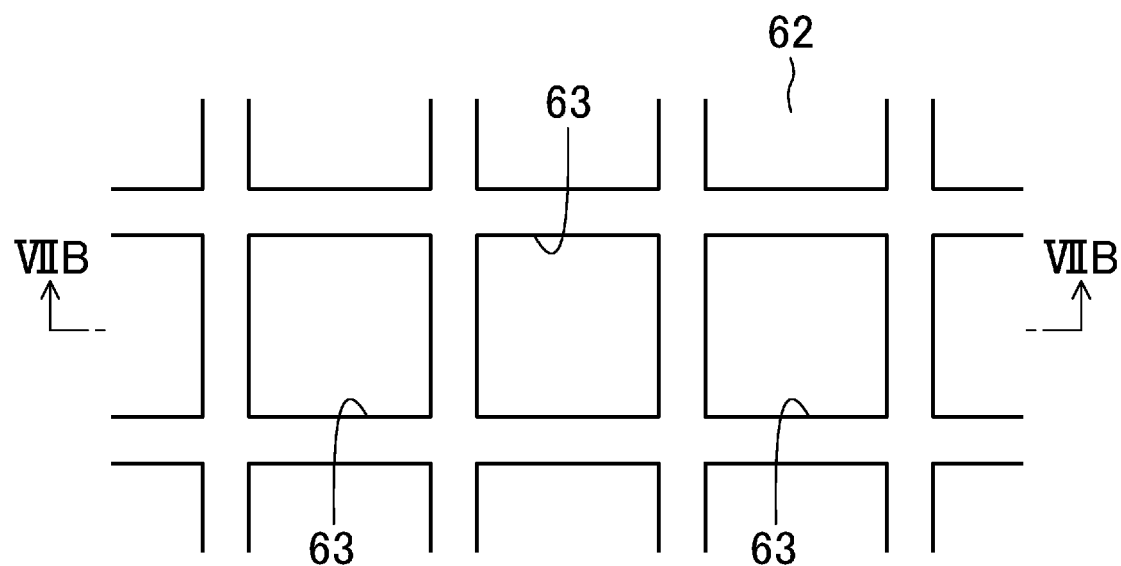
FIG. 7A is a plan view of a part of a belt surface of a conveyor belt in a modification.
Figure 7B:
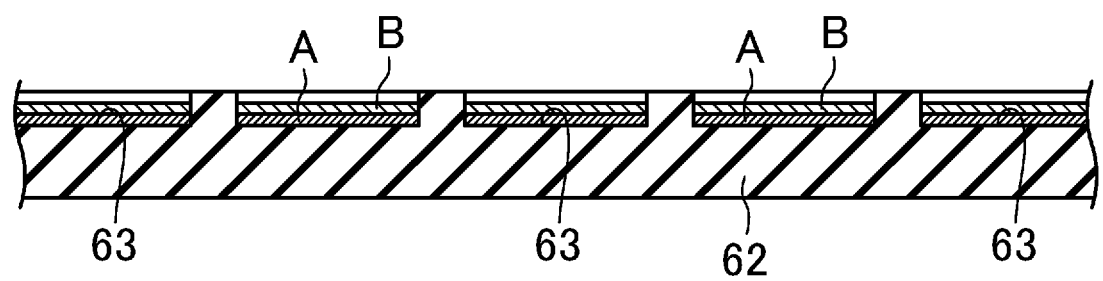
FIG. 7B is a cross-sectional view taken along a line VIIB-VIIB in FIG. 7A.

As illustrated in FIGS. 7A and 7B, the belt-conveyor system 60 may be configured such that a plurality of recesses 63 aligned along the lengthwise direction and the width direction is formed in a surface of the conveyor belt 62, and, in each of the recesses 63, a liquid laminated structure composed of the first and second liquids is formed. Using the belt-conveyor system 60 having this configuration, the first and second liquids react with each other in each of the recesses 63, and accordingly, an inorganic oxide in the form of a thin film with high uniformity can be achieved. Note that a transport unit is not particularly limited to the belt-conveyor system 60, and is only required to have a continuous transport surface along a transport direction.

Figure 8A:
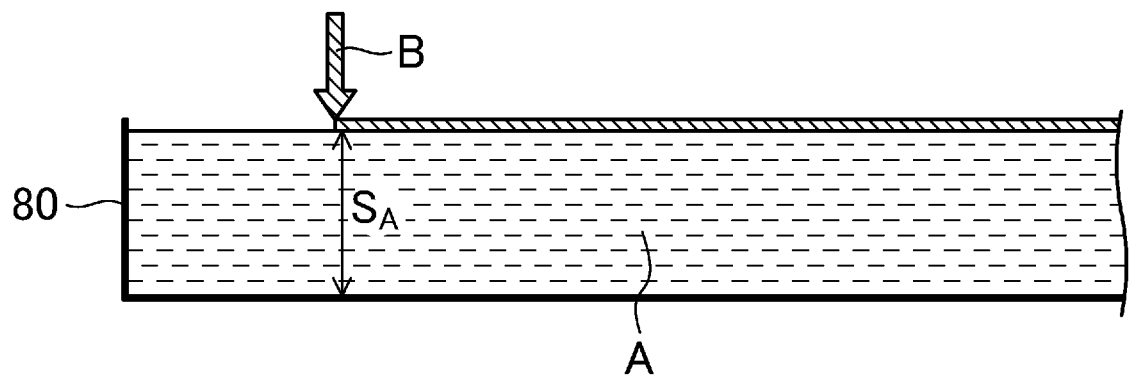
FIG. 8A is a diagram illustrating a specific manner in which, in a mode of supplying and allowing one, staying still, of the first liquid and the second liquid to have contact with the other while allowing the other to move, the one is supplied with the other.
Figure 8B:
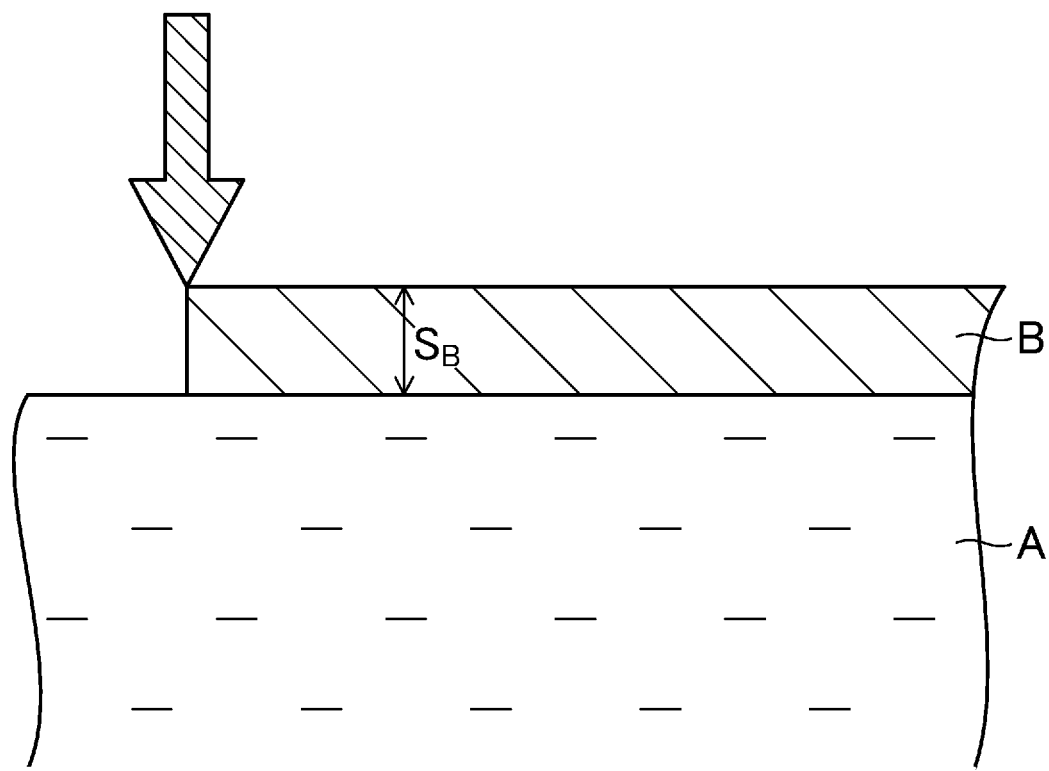
FIG. 8B is an enlarged cross-sectional view of surface layers of one and the other of the first and second liquids in the mode of contact illustrated in FIG. 8A.

In the mode of supplying staying-still one of the first and second liquids with the other to bring the liquids into contact with each other and moving the other, examples of a specific manner of supplying the one with the other include a manner of, as illustrated in FIGS. 8A and 8B, storing one A of the first and second liquids in a liquid tank 80, and supplying the other B onto the surface of the one to allow the liquids to flow by an extrusion-and-displacement action. Here, the segment size $S_A$ of the one A and the segment size $S_B$ of the other B in a state in which a gel in the form of a thin film can be formed by the contact between the first and second liquids are respectively equivalent to layer thicknesses at the cross-sections perpendicular to the flow direction of the other B in a state in which a liquid laminated structure is formed by supplying the other B onto the surface of the staying-still one A. In this case, the second liquid is suitably stored in the liquid tank 80. In this manner, the duration of contact between the first and second liquids can be controlled by the speed of supply of the other B. Furthermore, one or both of the first and second liquids may be composed of a plurality of liquids. Examples of a unit for supplying the other B include a unit configured to allow the other B to flow out of the opening of a slit of a nozzle, and a unit configured to drop droplets of the other B from a nozzle or a showerhead. Furthermore, the unit for supplying the other B may be configured to be movably provided so that a position for supplying the other B to the one A can be changed. Note that an inorganic oxide to be produced can be collected together with an overflow liquid from the liquid tank 80.

The contact of the first and second liquids may be established using a single mode among the above-mentioned modes or using a combination of a plurality of the modes. Furthermore, the contact of the first and second liquids may be established in a state in which, as is the case of using a reactor or other devices, a gas phase is not present and accordingly a free interface is not present. Alternatively, the contact of the first and second liquids may be established in a state in which, as is the case of forming a liquid laminated structure by using a coating die or other devices, a gas phase is present and accordingly a free interface is present.

Figure 9A:
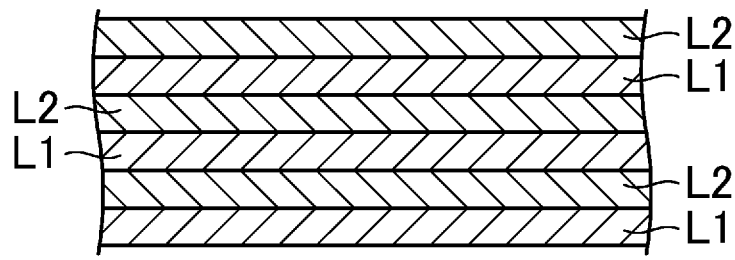
FIG. 9A is a cross-sectional view illustrating a first liquid-laminated structure.
Figure 9B:
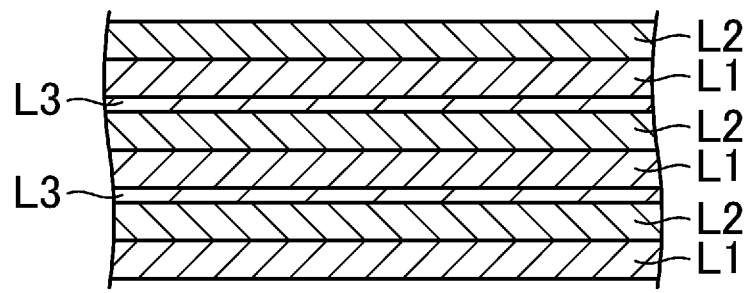
FIG. 9B is a cross-sectional view illustrating a second liquid-laminated structure.
Figure 9C:
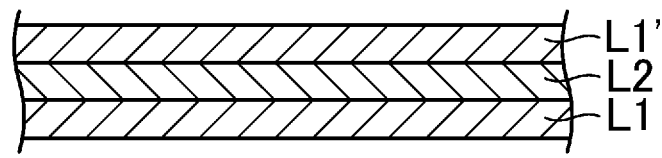
FIG. 9C is a cross-sectional view illustrating a third liquid-laminated structure.

When the first and second liquids are brought into contact with each other to form a liquid laminated structure, as illustrated in FIG. 9A, a structure in which a plurality of the first liquid L1 and a plurality of the second liquids L2 are laminated alternately may be formed. Alternatively, as illustrated in FIG. 9B, a liquid laminated structure may be formed in which a layer of a third liquid L3 not having compatibility with any one of the first liquid L1 and the second liquid L2 and not involved in a reaction between the first liquid L1 and the second liquid L2 is provided between laminated bodies each composed of the first liquid L1 and the second liquid L2. With this structure, the laminated bodies each composed of the first liquid L1 and the second liquid L2 are independent from each other, and accordingly, the unity of an inorganic oxide in the form of a thin film is substantially prevented, and thus, the production efficiency of the inorganic oxide in the form of the thin film can be increased. Alternatively, as illustrated in FIG. 9C, a liquid laminated structure may be formed in which, on each side of the second liquid L2, a corresponding one of the first liquids L1 and L1' containing different types of inorganic oxide precursors is provided. With this structure, an inorganic oxide in the form of a thin film in which different types of inorganic oxides are bonded together can be achieved.

The segment size $S_1$ of the first liquid at the time of contact between the first and second liquids is 500 μm or smaller, but, from the viewpoint of producing the inorganic oxide in the form of the thin film with high production efficiency, the segment size $S_1$ is suitably 5 μm or larger, more suitably 10 μm or larger, still more suitably 15 μm or larger, still further more suitably 30 μm or larger, still further more suitably 50 μm or larger, still further more suitably 100 μm or larger, and from the viewpoint of forming a thin film with high selectivity and thereby producing the inorganic oxide in the form of the thin film with high production efficiency, suitably 450 μm or smaller, more suitably 350 μm or smaller, still more suitably 300 μm or smaller, still further more suitably 250 μm or smaller, still further more suitably 200 μm or smaller. The segment size $S_1$ of the first liquid is suitably 5 μm or larger and 450 μm or smaller, more suitably 10 μm or larger and 350 μm or smaller, still more suitably 15 μm or larger and 300 μm or smaller, still further more suitably 30 μm or larger and 250 μm or smaller, still further more suitably 50 μm or larger and 200 μm or smaller, still further more suitably 100 μm or larger and 200 μm or smaller.

The segment size $S_2$ of the second liquid at the time of contact between the first and second liquids is, from the viewpoint of producing the inorganic oxide in the form of the thin film with high production efficiency, suitably 5 μm or larger, more suitably 20 μm or larger, still more suitably 50 μm or larger, still further more suitably 80 μm or larger, still further more suitably 100 μm or larger, and from the viewpoint of forming a thin film with high selectivity and thereby producing the inorganic oxide in the form of the thin film with high production efficiency, suitably 20 mm or smaller, more suitably 10 mm or smaller, still more suitably 5 mm or smaller, still further more suitably 1 mm or smaller, still further more suitably 500 μm or smaller. The segment size $S_2$ of the second liquid is suitably 5 μm or larger and 20 mm or smaller, more suitably 20 μm or larger and 10 mm or smaller, still more suitably 50 μm or larger and 5 mm or smaller, still further more suitably 80 μm or larger and 1 mm or smaller, still further more suitably 100 μm or larger and 500 μm or smaller.

From the viewpoint of producing the inorganic oxide in the form of the thin film with high production efficiency, the segment size $S_1$ of the first liquid at the time of contact between the first and second liquids is suitably equal to the segment size $S_2$ of the second liquid, or smaller than the segment size $S_2$ of the second liquid. The ratio ($S_2/S_1$) of the segment size $S_2$ of the second liquid to the segment size $S_1$ of the first liquid at the time of contact between the first and second liquids is, from the viewpoint of ensuring a stable operation and a stable flow state and thereby producing the inorganic oxide in the form of the thin film with high production efficiency, suitably 0.1 or more, more suitably 0.5 or more, still more suitably 1.0 or more, and from the viewpoint of producing the inorganic oxide in the form of the thin film with high production efficiency, suitably 500 or less, more suitably 100 or less, still more suitably 20 or less. This segment size ratio ($S_2/S_1$) is suitably 0.1 or more and 500 or less, more suitably 0.5 or more and 100 or less, still more suitably 1.0 or more and 20 or less.

At the inorganic-oxide-formation step in the method for producing the inorganic oxide in the form of the thin film according to the embodiment, in the case of moving both of the first and second liquids, the ratio (molar movement rate ratio=$m_2/m_1$) of the molar movement rate $m_2$ of the inorganic-oxide-forming substance of the second liquid to the molar movement rate $m_1$ of the inorganic oxide precursor of the first liquid at the time of contact between the first and second liquids is, from the viewpoint of directly and continuously producing the inorganic oxide in the form of the thin film, suitably 2 or more, more suitably 10 or more, still more suitably 50 or more, and from the viewpoint of economic efficiency, suitably 300 or less, more suitably 200 or less, still more suitably 150 or less. This molar movement rate ratio ($m_2/m_1$) is suitably 2 or more and 300 or less, more suitably 10 or more and 200 or less, still more suitably 50 or more and 150 or less. However, in the case of using the second liquid repeatedly by circulation or other ways, the problem of economic efficiency can be naturally avoided, and therefore, the molar movement rate ratio ($m_2/m_1$) may be a value of the order of a thousand or ten thousands. Note that the molar movement rate $m_1$ of the first liquid can be controlled by the inorganic oxide precursor content $c_1$ of the first liquid and the flow rate $Q_1$ or the transport rate $Q_1'$ of the first liquid. The molar movement rate $m_1$ of the first liquid is calculated using the flow rate $Q_1$ or the transport rate $Q_1'$ of the first liquid, the inorganic oxide precursor content $c_1$ of the first liquid, the density of the first liquid, and the molecular weight of the inorganic oxide precursor in the first liquid. The molar movement rate $m_2$ of the second liquid can be controlled by the inorganic-oxide-forming substance content $c_2$ of the second liquid and the flow rate $Q_2$ or the transport rate $Q_2'$ of the second liquid. The molar movement rate $m_2$ of the second liquid is calculated using the flow rate $Q_2$ or the transport rate $Q_2'$ of the second liquid, the inorganic-oxide-forming substance content $c_2$ of the second liquid, the density of the second liquid, and the molecular weight of the inorganic-oxide-forming substance in the second liquid.

In the case where the first liquid is allowed to flow, the linear flow velocity $u_1$ of the first liquid at the time of contact between the first and second liquids is, from the viewpoint of producing the inorganic oxide in the form of the thin film with high production efficiency, suitably 0.0001 m/s or more, more suitably 0.005 m/s or more, still more suitably 0.01 m/s or more, still further more suitably 0.03 m/s or more, still further more suitably 0.05 m/s or more, still further more suitably 0.1 m/s or more, and from the viewpoint of forming a thin film with high selectivity and thereby producing the inorganic oxide in the form of the thin film with high production efficiency, suitably 100 m/s or less, more suitably 20 m/s or less, still more suitably 10 m/s or less, still further more suitably 5 m/s or less, still further more suitably 3 m/s or less, still further more suitably 1 m/s or less. The linear flow velocity $u_1$ of the first liquid is suitably 0.0001 m/s or more and 100 m/s or less, more suitably 0.005 m/s or more and 20 m/s or less, still more suitably 0.01 m/s or more and 10 m/s or less, still further more suitably 0.03 m/s or more and 5 m/s or less, still further more suitably 0.05 m/s or more and 3 m/s or less, still further more suitably 0.1 m/s or more and 1 m/s or less.

In the case where the second liquid is allowed to flow, the linear flow velocity $u_2$ of the second liquid at the time of contact between the first and second liquids is, from the viewpoint of producing the inorganic oxide in the form of the thin film with high production efficiency, suitably 0.001 m/s or more, more suitably 0.005 m/s or more, still more suitably 0.01 m/s or more, still further more suitably 0.03 m/s or more, still further more suitably 0.05 m/s or more, still further more suitably 0.1 m/s or more, and from the viewpoint of forming a thin film with high selectivity and thereby producing the inorganic oxide in the form of the thin film with high production efficiency, suitably 100 m/s or less, more suitably 20 m/s or less, still more suitably 10 m/s or less, still further more suitably 5 m/s or less, still further more suitably 3 m/s or less, still further more suitably 1 m/s or less. The linear flow velocity $u_2$ of the second liquid is suitably 0.001 m/s or more and 100 m/s or less, more suitably 0.005 m/s or more and 20 m/s or less, still more suitably 0.01 m/s or more and 10 m/s or less, still further more suitably 0.03 m/s or more and 5 m/s or less, still further more suitably 0.05 m/s or more and 3 m/s or less, still further more suitably 0.1 m/s or more and 1 m/s or less.

Note that the linear flow velocity $u_1$ of the first liquid and the linear flow velocity $u_2$ of the second liquid can be controlled by the flow rate $Q_1$ of the first liquid and the flow rate $Q_2$ of the second liquid respectively, and by the shape of a device. Furthermore, in each of the modes of contact between the first and second liquids illustrated in FIGS. 1 and 2, the linear flow velocity $u_1$ of the first liquid and the linear velocity $u_2$ of the second liquid can be calculated by dividing the respective flow rates $Q_1$ and $Q_2$ by the passage area of a cross-section at a confluence portion, the cross-section being perpendicular to the flow direction after the confluence. In each of the modes, illustrated in FIGS. 3A and 3B to 8A and 8B, of contact between the first and second liquids, the linear flow velocity $u_1$ of the first liquid and the linear flow velocity $u_2$ of the second liquid can be calculated by dividing the respective flow rates $Q_1$ and $Q_2$ by the passage area of a cross-section perpendicular to the flow direction of the liquids in a state in which the liquid laminated structure is formed.

In the case where both of the first and second liquids are allowed to flow, the linear flow velocity $u_1$ of the first liquid and the linear flow velocity $u_2$ of the second liquid at the time of contact between the first and second liquids may be equal to the linear flow velocity $u_2$ of the second liquid, or may be higher or lower than the linear flow velocity $u_2$ of the second liquid. The ratio ($u_1/u_2$) of the linear flow velocity $u_1$ of the first liquid to the linear flow velocity $u_2$ of the second liquid at the time of contact between the first and second liquids is, from the viewpoint of producing the inorganic oxide in the form of the thin film with high production efficiency, suitably 0.01 or more, more suitably 0.1 or more, still more suitably 0.5 or more, and from the viewpoint of forming a thin film with high selectivity and thereby pro- ducing the inorganic oxide in the form of the thin film with high production efficiency, suitably 100 or less, more suitably 60 or less, still more suitably 10 or less. This linear flow velocity ratio ($u_1/u_2$) is suitably 0.01 or more and 100 or less, more suitably 0.1 or more and 60 or less, still more suitably 0.5 or more and 10 or less.

In the case where the first liquid is allowed to flow, from the viewpoint of forming a thin film with high selectivity and thereby producing the inorganic oxide in the form of the thin film with high production efficiency, the first liquid suitably flows under a laminar flow condition until the time when the first and second liquids come into contact with each other, specifically until just before the contact. The Reynolds number $Re_1$ of the first liquid until the time when the first and second liquids come into contact with each other is, from the viewpoint of producing the inorganic oxide in the form of the thin film with high production efficiency, suitably 0.1 or more, more suitably 5 or more, still more suitably 10 or more, and from the viewpoint of forming a thin film with high selectivity and thereby producing the inorganic oxide in the form of the thin film with high production efficiency, suitably 1500 or less, more suitably 500 or less, still more suitably 300 or less. The Reynolds number $Re_1$ of the first liquid is suitably 0.1 or more and 1500 or less, more suitably 5 or more and 500 or less, still more suitably 10 or more and 300 or less. Note that the Reynolds number $Re_1$ of the first liquid can be controlled by the flow rate $Q_1$ of the first liquid and the shape of a device.

In the case where the second liquid is allowed to flow, from the viewpoint of forming a thin film with high selectivity and thereby producing the inorganic oxide in the form of the thin film with high production efficiency, the second liquid suitably flows under a laminar flow condition until the time when the first and second liquids come into contact with each other, specifically until just before the contact. The Reynolds number $Re_2$ of the second liquid until the time when the first and second liquids come into contact with each other is, from the viewpoint of producing the inorganic oxide in the form of the thin film with high production efficiency, suitably 0.01 or more, more suitably 0.5 or more, still more suitably 1 or more, and from the viewpoint of forming a thin film with high selectivity and thereby producing the inorganic oxide in the form of the thin film with high production efficiency, suitably 500 or less, more suitably 200 or less, still more suitably 100 or less. The Reynolds number $Re_2$ of the second liquid is suitably 0.01 or more and 500 or less, more suitably 0.5 or more and 200 or less, still more suitably 1 or more and 100 or less. Note that the Reynolds number $Re_2$ of the second liquid can be controlled by the flow rate $Q_2$ of the second liquid and the shape of a device.

In the case where both of the first and second liquids are allowed to flow, the Reynolds number $Re_1$ of the first liquid until the time when the first and second liquids come into contact with each other may be equal to the Reynolds number $Re_2$ of the second liquid, or may be larger or smaller than the Reynolds number $Re_2$ of the second liquid. The ratio ($Re_1/Re_2$) of the Reynolds number $Re_1$ of the first liquid to the Reynolds number $Re_2$ of the second liquid until the time when the first and second liquids come into contact with each other is, from the viewpoint of producing the inorganic oxide in the form of the thin film with high production efficiency, suitably 0.01 or more, more suitably 0.1 or more, still more suitably 1 or more, still further more suitably 5 or more, still further more suitably 10 or more, still further more suitably 15 or more, and from the view- point of forming a thin film with high selectivity and thereby producing the inorganic oxide in the form of the thin film with high production efficiency, suitably 1000 or less, more suitably 500 or less, still more suitably 200 or less, still further more suitably 100 or less, still further more suitably 50 or less, still further more suitably 30 or less, still further more suitably 25 or less. The Reynolds number ratio ($Re_1/Re_2$) is suitably 0.01 or more and 1000 or less, more suitably 0.1 or more and 500 or less, still more suitably 1 or more and 200 or less, still further more suitably 5 or more and 100 or less, still further more suitably 10 or more and 50 or less, still further more suitably 15 or more and 30 or less, still further more suitably 15 or more and 25 or less.

The duration of contact between the first and second liquids is, from the viewpoint of forming a thin film with high selectivity and thereby producing the inorganic oxide in the form of the thin film with high production efficiency, suitably 0.5 sec or longer, more suitably 1.5 sec or longer, still more suitably 2.0 sec or longer, and from the viewpoint of producing the inorganic oxide in the form of the thin film with high production efficiency, suitably 600 sec or shorter, more suitably 180 sec or shorter, still more suitably 100 sec or shorter, still further more suitably 50 sec or shorter, still further more suitably 10 sec or shorter. This duration of contact is suitably 0.5 sec or longer and 600 sec or shorter, more suitably 1.5 sec or longer and 180 sec or shorter, still more suitably 2.0 sec or longer and 100 sec or shorter, still further more suitably 2.0 sec or longer and 50 sec or shorter, still further more suitably 2.0 sec or longer and 10 sec or shorter.

The reaction temperature at the time of contact between the first and second liquids is only required to be a temperature at which the first and second liquids maintain themselves in a liquid state. From the viewpoint of ensuring a stable flow state, the reaction temperature is suitably higher by 3° C. or more than a higher one of the melting point of the first liquid and the melting point of the second liquid, specifically suitably 10° C. or higher, more suitably 20° C. or higher. Furthermore, from the viewpoint of ensuring a stable flow state, the reaction temperature is suitably lower by 3° C. or more than a lower one of the boiling point of the first liquid and the boiling point of the second liquid, specifically suitably 60° C. or lower, more suitably 40° C. or lower. This reaction temperature is suitably higher by 3° C. or more than a higher one of the melting point of the first liquid and the melting point of the second liquid and lower by 3° C. or more than a lower one of the boiling point of the first liquid and the boiling point of the second liquid, specifically suitably 10° C. or higher and 60° C. or lower, more suitably 20° C. or higher and 40° C. or lower.

As for the relation between the first and second liquids, an interfacial tension of the first liquid to the second liquid at a temperature at the time of contact between the first and second liquids is, from the viewpoint of directly and continuously producing the inorganic oxide in the form of the thin film, suitably 0.1 mN/m or more, more suitably 0.5 mN/m or more, still more suitably 1 mN/m or more, and from the same viewpoint, suitably 30 mN/m or less, more suitably 15 mN/m or less, still more suitably 10 mN/m or less. This interfacial tension is suitably 0.1 mN/m or more and 30 mN/m or less, more suitably 0.5 mN/m or more and 15 mN/m or less, still more suitably 1 mN/m or more and 10 mN/m or less. This interfacial tension is measured using a Wilhelmy type interfacial tensiometer.

There will be described a system for producing an inorganic oxide gel in the form of a thin film, the system being capable of being used at the inorganic-oxide-formation in the method for producing the inorganic oxide in the form of the thin film according to the embodiment.

Figure 10:
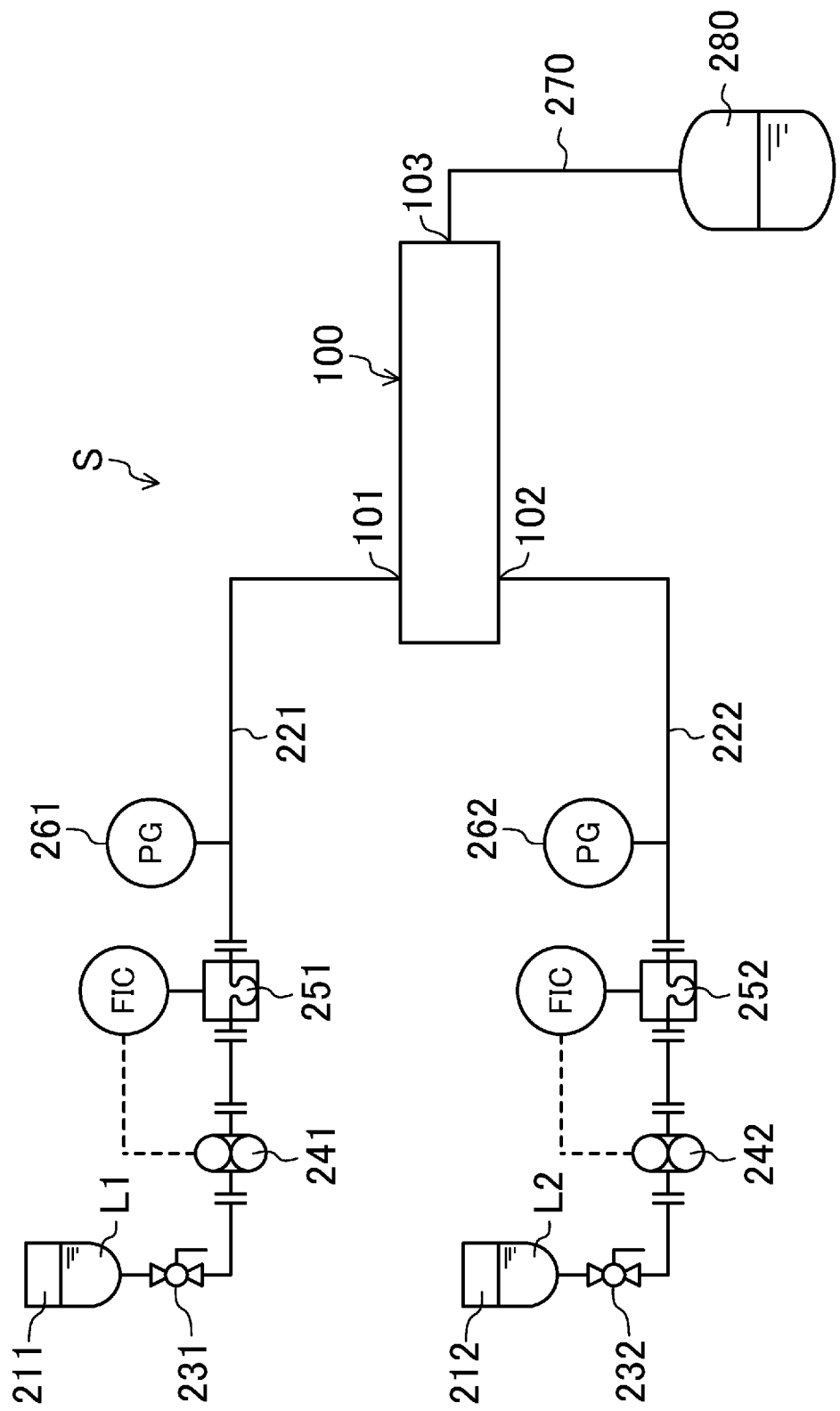
FIG. 10 is a diagram illustrating a configuration of a system for producing an inorganic oxide gel in the form of a thin film.
Figure 11A:
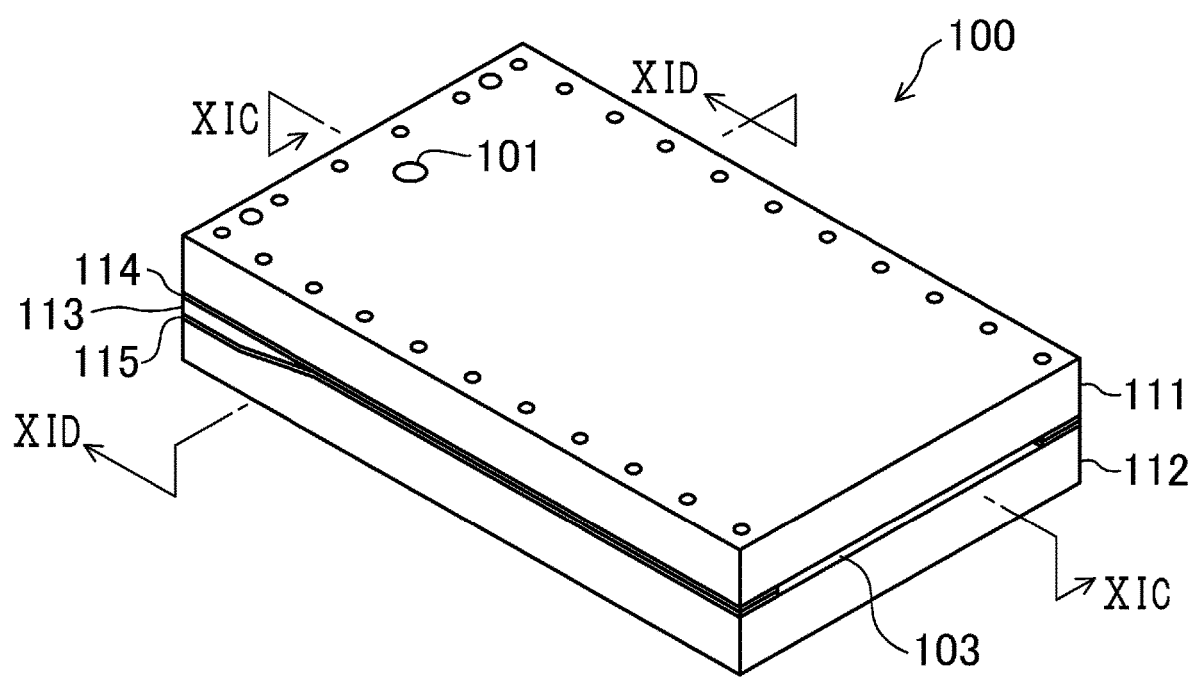
FIG. 11A is a perspective view of a substrate-laminated micromixer.
Figure 11B:
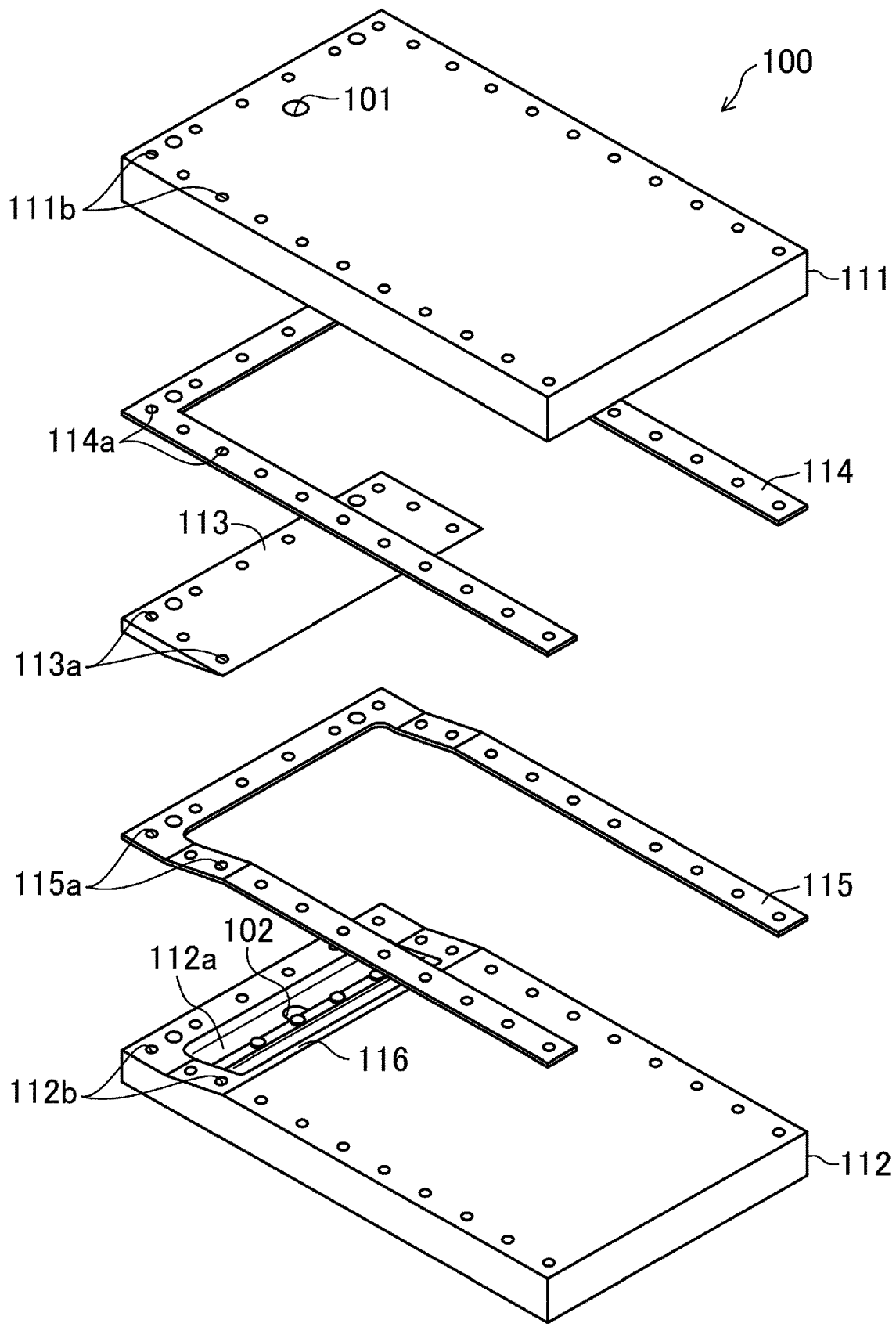
FIG. 11B is an exploded perspective view of the substrate-laminated micromixer.
Figure 11D:
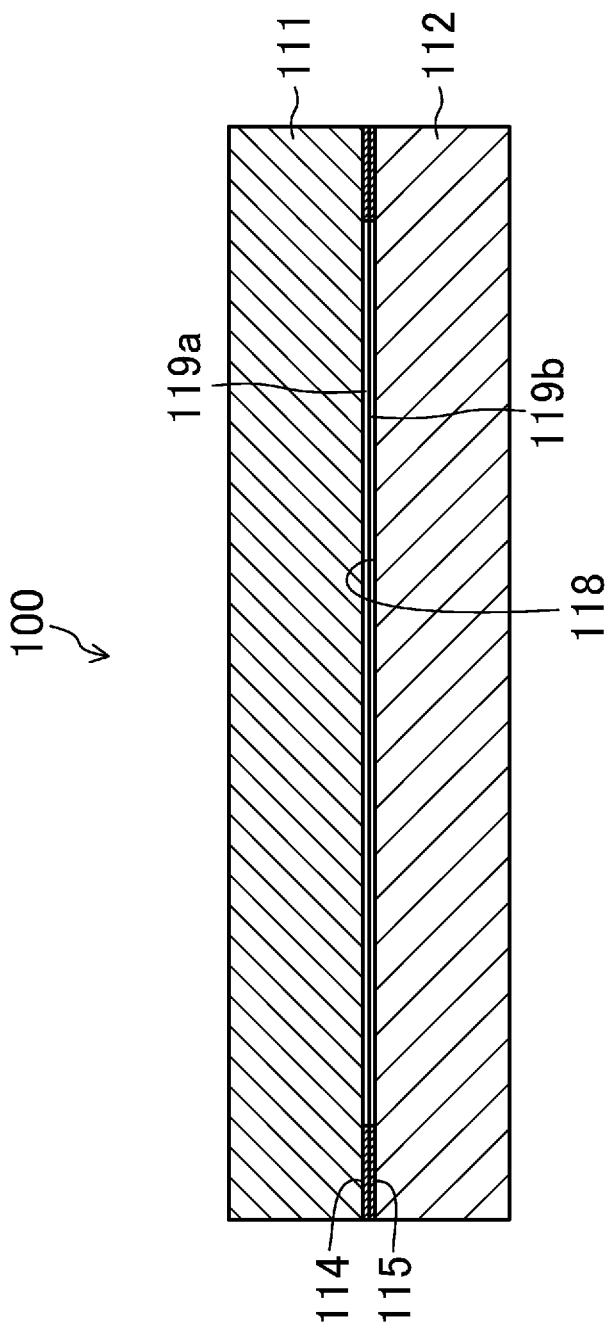
FIG. 11D is a cross-sectional view taken along a line XID-XID in FIG. 11A.

FIG. 10 is a diagram illustrating a system S for producing the inorganic oxide gel in the form of the thin film.

The system S for producing the inorganic oxide gel in the form of the thin film includes a microreactor 100. The microreactor 100 includes a first liquid inlet 101 and a second liquid inlet 102 on the upstream side thereof, and a liquid outlet 103 on the downstream side thereof.

The first liquid inlet 101 of the microreactor 100 is connected to a first liquid supply pipe 221 extending from a first storage tank 211 for storing the first liquid L1. Likewise, the second liquid inlet 102 is connected to a second liquid supply pipe 222 extending from a second storage tank 212 for storing the second liquid L2. In the first liquid supply pipe 221 and the second liquid supply pipe 222, cocks 231 and 232 for switching between circulation and interception of the liquids, pumps 241 and 242 for sending the liquids, and flowmeters 251 and 252 for detecting the flow rates of the liquids are respectively provided in series in this order from the upstream side at some midpoints. Furthermore, pressure gauges 261 and 262 for detecting the pressures of the liquids are installed downstream from the flowmeters 251 and 252, respectively. The pumps 241 and 242 are electrically connected to the flowmeters 251 and 252, respectively, so as to perform the feedback control of the flow rates of the liquids. A slurry collecting pipe 270 extends from the liquid outlet 103 of the microreactor 100 and is connected to a slurry collecting tank 280.

As an example of the micromixer 100, FIGS. 11A to 11E illustrate a substrate-laminated micromixer 100.

This substrate-laminated micromixer 100 is configured such that an upper substrate 111, a lower substrate 112, an intermediate substrate 113, an upper spacer 114, and a lower spacer 115 are integrally laminated.

The upper substrate 111 is formed in the shape of a rectangular plate, and one end of the long side is configured as an upstream portion while the other end is configured as a downstream portion. In the upstream portion of the upper substrate 111, the first liquid inlet 101 is formed so as to penetrate the upper substrate 111 in the thickness direction at an intermediate portion in the width direction. On the lower face side of the upstream portion of the upper substrate 111, a first liquid storage recess 111a extending along the width direction is provided so as to communicate with the first liquid inlet 101. At each of edges on both long sides of the upper substrate 111 and an edge on the upstream short side of the upper substrate 111, a plurality of positioning holes 111a penetrating the upper substrate 111 in the thickness direction is provided so as to be spaced out.

As is the case of the upper substrate 111, the lower substrate 112 is formed in the shape of a rectangular plate, and one end of the long side is configured as an upstream portion while the other end is configured as a downstream portion. The upstream portion of the lower substrate 112 is chipped a manner on the upper face side, and a slope portion 116 is provided so that the substrate thickness is gradually larger toward the downstream side, in which the slope portion 116 is continuous to the edge on the upstream short side of the lower substrate 112, and the edge is formed so as to have a smaller substrate-thickness. In the upstream portion of the lower substrate 112, the second liquid inlet 102 is formed so as to penetrate the lower substrate 112 in the thickness direction at an intermediate portion in the width direction. On the upper face side of the upstream portion of the lower substrate 112, a second liquid storage recess 112a including a part of the edge and a part of the slope portion 116 and extending along the width direction is provided so as to communicate with the second liquid inlet 102. At each of edges on both long sides of the lower substrate 112 and an edge on the upstream short side of the lower substrate 112, a plurality of positioning holes 112*b* corresponding to the respective positioning holes 111*b* of the upper substrate 111 is provided so as to be spaced out.

The intermediate substrate 113 is formed in the shape of a wedge so as to correspond to the chipped portion of the lower substrate 112. At each of edges on both sides and the upstream side of the intermediate substrate 113, a plurality of positioning holes 113*a* corresponding to the respective positioning holes 111*b* of the upper substrate 111 and penetrating the intermediate substrate 113 in the thickness direction is provided so as to be spaced out.

The upper spacer 114 is formed in a thin and narrow band shape corresponding to the edges on both long sides and the upstream short side of the lower surface of the upper substrate 111. The lower spacer 115 is formed in a thin and narrow bent band shape corresponding to the edges on both long sides and the upstream short side of the upper surface of the lower substrate 112. In the upper spacer 114 and the lower spacer 115, a plurality of positioning holes 114*a* and 115*a* corresponding to the respective positioning holes 111*b* of the upper substrate 111 and penetrating the respective spacers in the thickness direction is provided so as to be spaced out.

In the substrate-laminated micromixer 100, the lower spacer 115 is laminated on the lower substrate 112, and the intermediate substrate 113 is laminated on an upstream portion of the lower spacer 115. On the intermediate substrate 113 on the upstream side and a portion of the lower spacer 115 downstream from the intermediate substrate 113, the upper spacer 114 is laminated. On the upper spacer 114, the upper substrate 111 is laminated. Each of the positioning holes 111*b* of the upper substrate 111 is aligned with a corresponding one of positioning holes 114*a* of the upper spacer 114, a corresponding one of positioning holes 113*a* of the intermediate substrate 113, a corresponding one of positioning holes 115*a* of the lower spacer 115, and a corresponding one of positioning holes 112*b* of the lower substrate 112. A pin, not illustrated, is inserted for fitting into each set of the positioning holes, whereby the components are integrated.

The substrate-laminated micromixer 100 is configured such that, a first liquid passage 117*a* equivalent to the thickness of the upper spacer 114 is provided between the lower face of the upper substrate 111 and the upper face of the intermediate substrate 113 so as to communicate with the first liquid storage recess 111*a*. A second liquid passage 117*b* equivalent to the thickness of the lower spacer 115 is provided between the upper face of the slope portion 116 of the lower substrate 112 and the lower face of the intermediate substrate 113 so as to communicate with the second liquid storage recess 112*a*. In a portion downstream from the intermediate substrate 113, a liquid contact portion 118 equivalent to the total of the thickness of the upper spacer 114 and the thickness of the lower spacer 115 is provided. The opening of a slit at a downstream end that is continuous to the liquid contact portion 118 is configured as the liquid outlet 103. At the downstream end of the intermediate substrate 113, a first slit 119*a* at which the first liquid passage 117*a* is opened into the liquid contact portion 118 and a second slit 119*b* at which the second liquid passage 117*b* is opened into the liquid contact portion 118 are provided in parallel.

In the substrate-laminated microreactor 100, the first liquid L1 flowing through the first liquid passage 117*a* is allowed to flow out of the first slit 119*a*, and, at the liquid contact portion 118, is brought into contact with the second liquid L2 flowing through the second liquid passage 117*b* and flowing out of the second slit 119*b*. At this time, the second liquid L2 comes into contact with the first liquid L1 from behind at an angle with respect to the flow direction of the first liquid L1, and then, the liquids flow in the flow direction of the first liquid L1. The duration of contact during which the first liquid L1 and the second liquid L2 stayed in the liquid contact portion 118 is equivalent to the duration of reaction between the liquids.

In the substrate-laminated microreactor 100, the width $\delta_1$ of opening into the confluence portion in a direction perpendicular to the flow direction of the first liquid L1 at the first slit 119*a* from which the first liquid L1 flows out determines the segment size $S_1$ of the first liquid L1, and hence is 500 μm or smaller. The width $\delta_2$ of opening into the confluence portion in a direction perpendicular to the flow direction of the second liquid L2 at the second slit 119*b* from which the second liquid L2 flows out determines the segment size $S_2$ of the second liquid L2, and hence is suitably 5 mm or smaller. The angle of inclination of the slope portion 116 of the lower substrate 112 determines an angle θ which the flow direction of the first liquid L1 forms with the flow direction of the second liquid L2, and is suitably 0° or more and 60° or less.

Figure 12A:
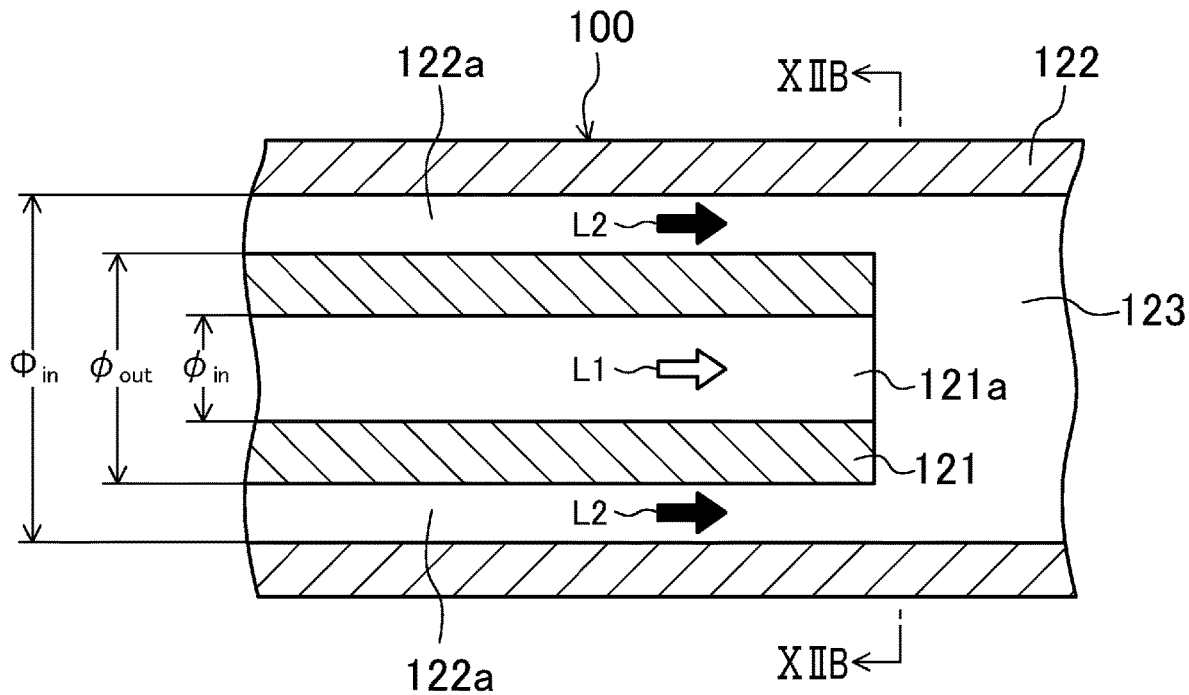
FIG. 12A is a longitudinal cross-sectional view of a principal portion of a double pipe microreactor.
Figure 12B:
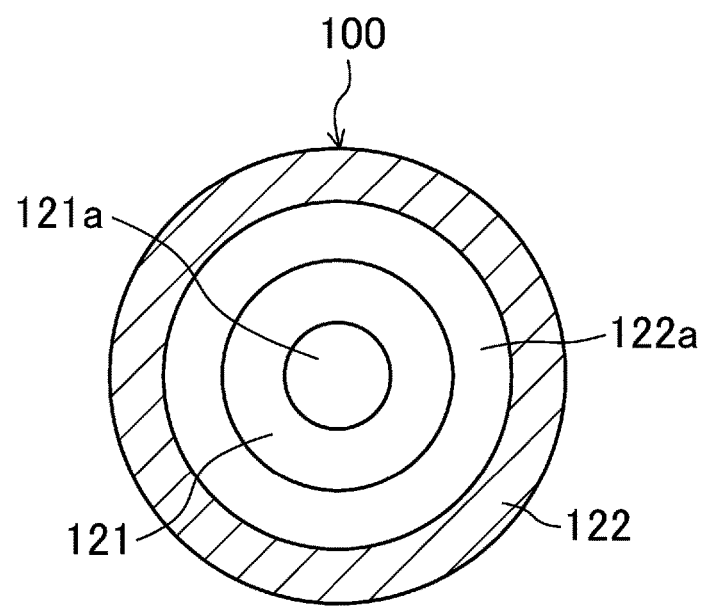
FIG. 12B is a cross-sectional view taken along a line XIIB-XIIB in FIG. 12A.
Figure 13A:
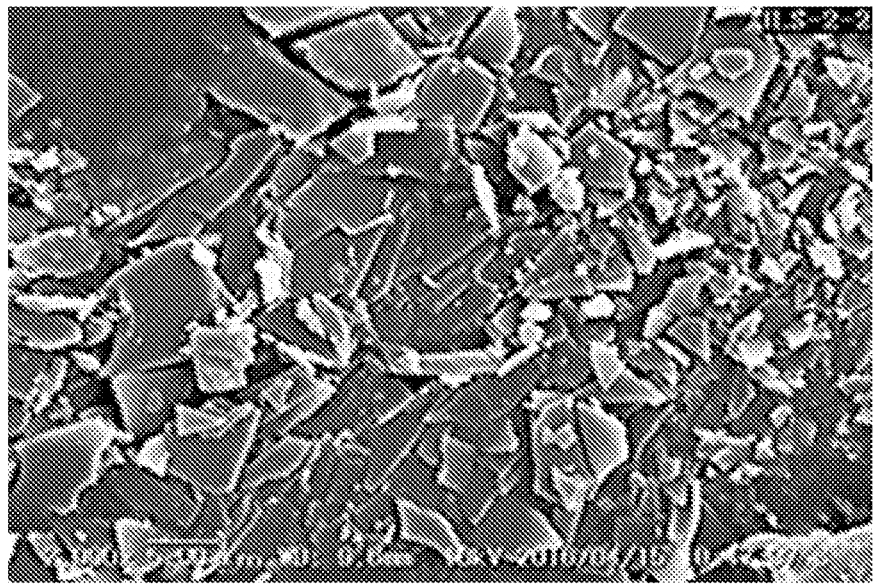
FIGS. 13A-13G are photographs of metal oxides obtained from Examples 1-1 to 1-7 observed using a microscope.
Figure 13B:
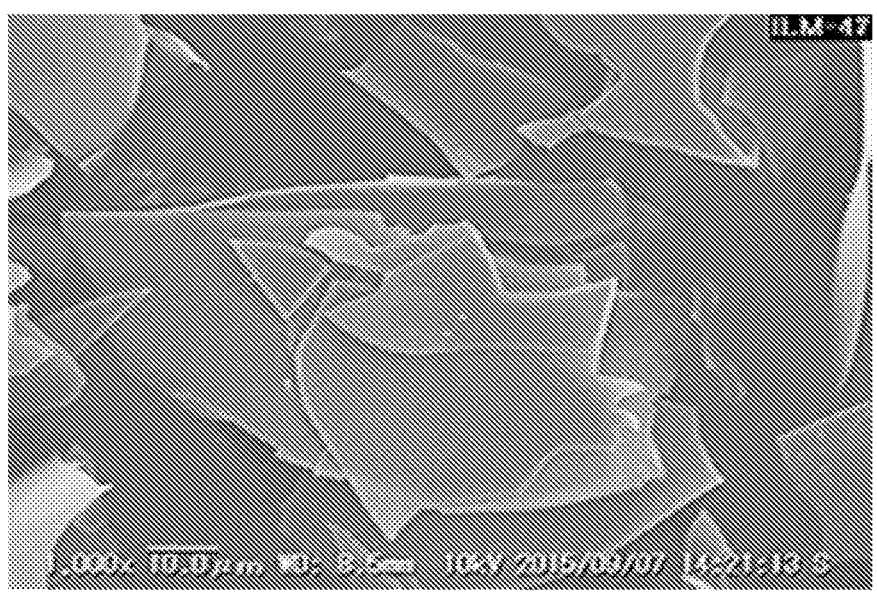
Figure 13C:
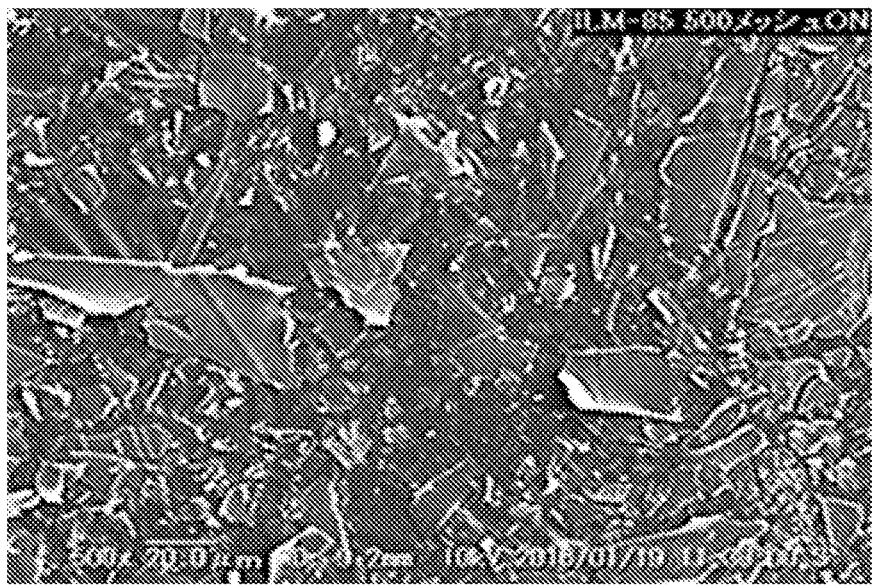
Figure 13D:
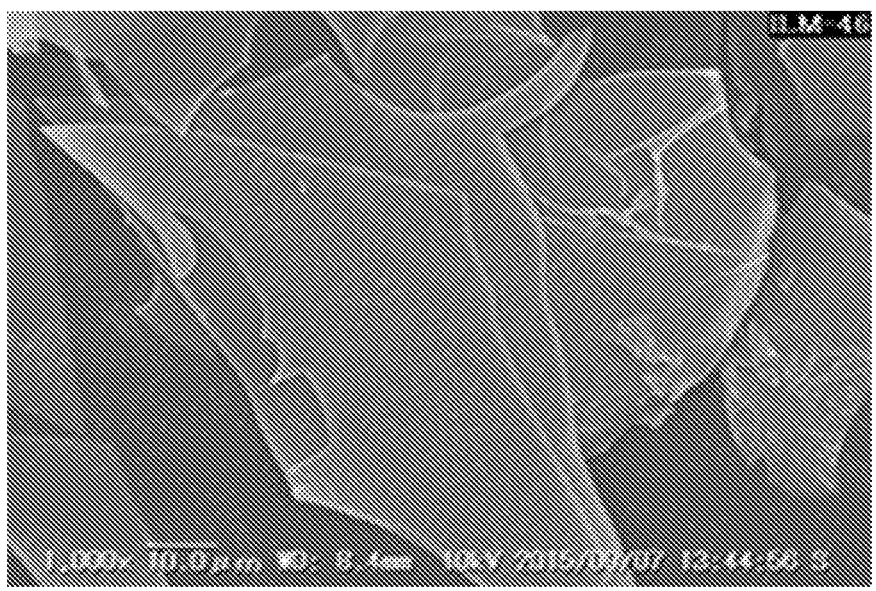
Figure 13E:
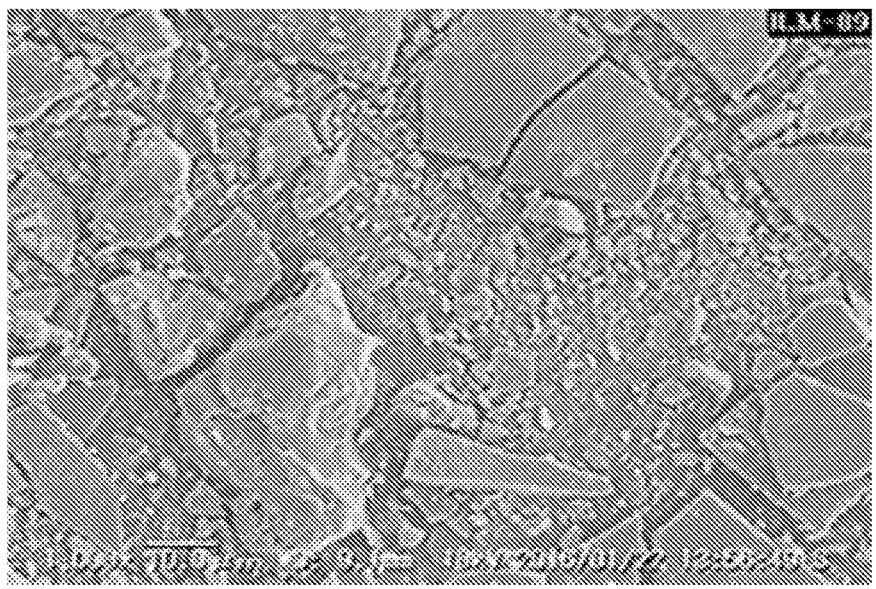
Figure 13F:
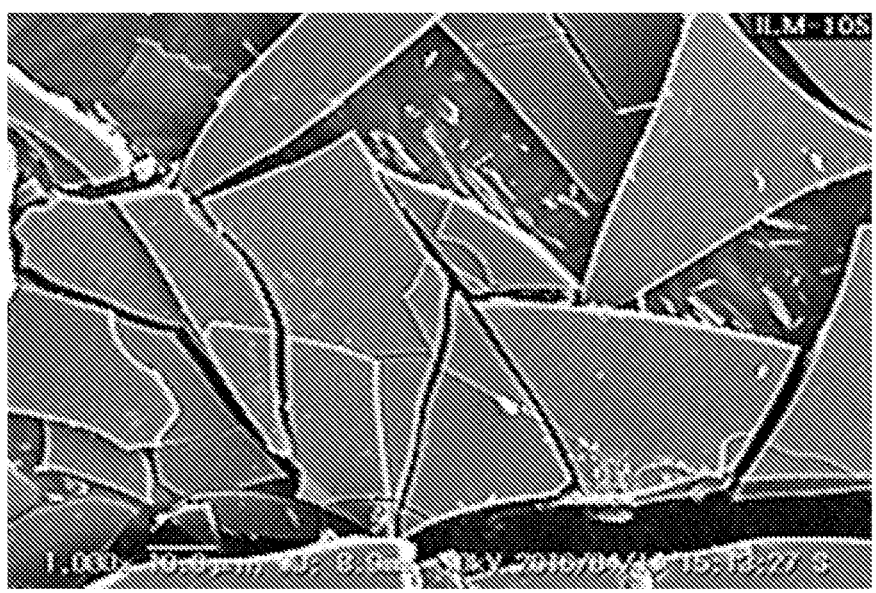
Figure 13G:
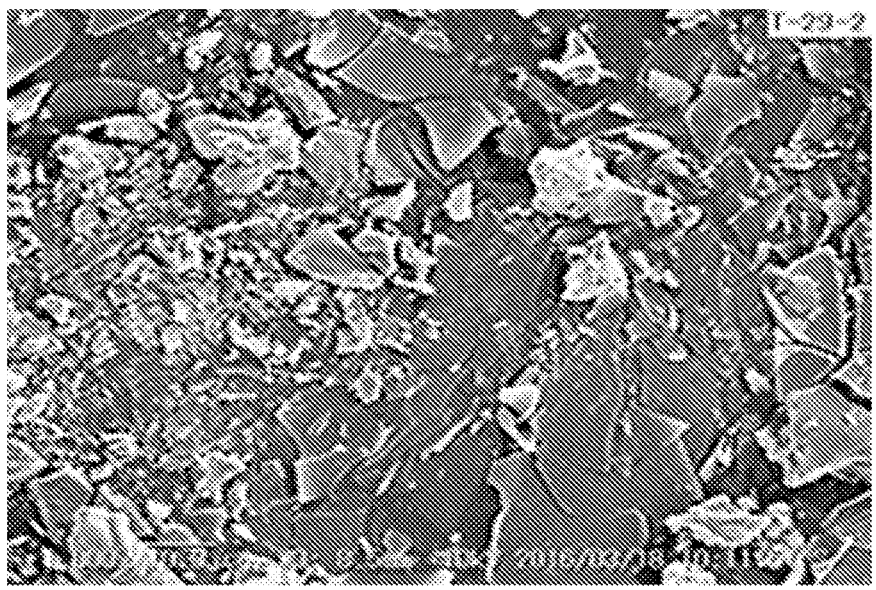

As another example of the micromixer 100, FIGS. 12A and 12B illustrate a double pipe microreactor 100.

This double pipe microreactor 100 includes an inner pipe 121 having a smaller diameter, and an outer pipe 122 having a larger diameter and coaxially provided so as to cover the inner piper 121. An end of the inner pipe 121 is positioned in an intermediate portion of the outer pipe 122. A first liquid passage 121*a* is provided inside the inner pipe 121, and a second liquid passage 122*a* is provided between the inner pipe 121 and the outer pipe 122, and furthermore, a liquid contact portion 123 is provided at a downstream end of the inner pipe 121. A first inlet 101 and a second inlet 102 that are provided on the upstream side of the microreactor 100 communicate with the first liquid passage 121*a* and the second liquid passage 122*a*, respectively. A liquid outlet 103 provided on the downstream side of the microreactor 100 is configured with an opening continuous to the liquid contact portion 123.

In this double pipe microreactor 100, the first liquid L1 flowing through the first liquid passage 121*a* inside the inner pipe 121 is allowed to flow out of an end of the inner pipe 121, and at the liquid contact portion 123, the first liquid L1 is brought into contact with the second liquid L2 flowing through the second liquid passage 122*a* between the inner pipe 121 and the outer pipe 122. At this time, both of the first liquid L1 and the second liquid L2 flow in the same direction, and come into contact with each other while maintaining the flow direction. Furthermore, the first liquid L1 comes into contact with the second liquid L2 so as to be covered with the second liquid L2. The duration of contact during which the first liquid L1 and the second liquid L2 stay in the liquid contact portion 123 is equivalent to the duration of reaction between the liquids.

In the double pipe microreactor 100, the inner diameter pin of the inner pipe 121 from which the first liquid L1 flows out, that is, the diameter of opening into the confluence portion in a direction perpendicular to the flow direction of the first liquid L1 determines the segment size $S_1$ of the first liquid L1, and hence is 500 μm or smaller. The width of the second liquid passage 122*a* through which the second liquid L2 flows, that is, half of the difference between the inner diameter Tin of the outer pipe 122 and the outer diameter (pout of the inner pipe 121, in other words, the clearance of opening into the confluence portion in a direction perpendicular to the flow direction of the second liquid L2 determines the segment size $S_2$ of the second liquid L2, and is suitably 5 mm or smaller. Note that the outer cross-section and inner cross-section of the inner pipe 121, and the inner cross-section of the outer pipe 122 are suitably circular, but may be noncircular and, in this case, the outer diameter pout and the inner diameter pin of the inner pipe 121 and the inner diameter Pin of the outer pipe 122 each means a hydraulic equivalent diameter (=4×(cross-sectional area)/(perimeter)).

The method for producing the inorganic oxide in the form of the thin film according to the embodiment includes: after obtaining a slurry containing an inorganic oxide gel in the form of a thin film in the inorganic-oxide-formation step, separating the inorganic oxide gel in the form of the thin film from the slurry by filtration or other ways; and drying and baking the resultant gel to finally obtain a solid inorganic oxide in the form of a thin film.

The average longitudinal diameter (the maximum diameter) of the inorganic oxide in the form of the thin film obtained by the production method according to the embodiment is suitably 2 μm or larger, more suitably 5 μm or larger, still more suitably 10 μm or larger, and suitably 300 μm or smaller, more suitably 100 μm or smaller, still more suitably 50 μm or smaller. This average longitudinal diameter is suitably 2 μm or larger and 300 μm or smaller, more suitably 5 μm or larger and 100 μm or smaller, still more suitably 10 μm or larger and 50 μm or smaller. The average longitudinal diameter is determined as the average of longitudinal diameters of 500 data points measured by the microscopic observation of then obtained inorganic oxide in the form of the thin film.

The average thickness of the inorganic oxide in the form of the thin film is suitably 0.01 μm or larger, more suitably 0.05 μm or larger, still more suitably 0.1 μm or larger, and suitably 1.5 μm or smaller, more suitably 1 μm or smaller, still more suitably 0.8 μm or smaller, still more suitably 0.5 μm or smaller, still more suitably 0.4 μm or smaller, still more suitably 0.3 μm or smaller. This average thickness is suitably 0.01 μm or larger and 1.5 μm or smaller, more suitably 0.05 μm or larger and 1 μm or smaller, still more suitably 0.1 μm or larger and 0.8 μm or smaller, still more suitably 0.1 μm or larger and 0.5 μm or smaller, still more suitably 0.1 μm or larger and 0.4 μm or smaller, still more suitably 0.1 μm or larger and 0.3 μm or smaller. The average thickness is determined as the average thickness of the cross-sections of 20 pieces obtained by cutting the obtained inorganic oxide in the form of the film and measured by microscopic observation.

The ratio of the average longitudinal diameter of the inorganic oxide in the form of the film to the average thickness thereof is suitably 5 or more, more suitably 30 or more, still more suitably 50 or more, and suitably 2000 or less, more suitably 800 or less, still more suitably 500 or less. This ratio is suitably 5 or more and 2000 or less, more suitably 30 or more and 800 or less, still more suitably 50 or more and 500 or less.

As for the above-mentioned embodiment, the following configurations are further disclosed.

<1> A method for producing an inorganic oxide in the form of a thin film, the method comprising a step of bringing a first liquid and a second liquid into contact with each other, the first liquid having an inorganic oxide precursor dissolved therein, the second liquid phase-separating from the first liquid and having a substance dissolved therein, the substance reacting with the inorganic oxide precursor of the first liquid to form an inorganic oxide derived from the inorganic oxide precursor, wherein the segment size of the first liquid at the time of contact between the first and second liquids is 500 μm or smaller.

<2> The method, according to <1>, for producing the inorganic oxide in the form of the thin film, wherein the inorganic oxide precursor includes an inorganic substance having a hydrolyzable functional group from which the inorganic oxide is derived by sol-gel transition accompanied by a hydrolysis reaction and a polycondensation reaction.

<3> The method, according to <1> or <2>, for producing the inorganic oxide in the form of the thin film, wherein the inorganic oxide precursor includes one or two or more of an alkoxide, a halide, a salt having a hydrolyzable functional group, a coordination compound having a hydrolyzable functional group, and amines of the inorganic oxide.

<4> The method, according to any one of <1> to <3>, for producing the inorganic oxide in the form of the thin film, wherein the inorganic oxide precursor suitably includes an alkoxide, more suitably a metal alkoxide, still more suitably a titanium alkoxide and a zirconium alkoxide, still further more suitably a titanium alkoxide and a zirconium alkoxide each having an alkyl group having 2 to 4, inclusive, carbon atoms.

<5> The method, according to <4>, for producing the inorganic oxide in the form of the thin film, wherein the titanium alkoxide includes tetraethyl orthotitanate, tetraisopropyl orthotitanate, or tetra-n-butyl orthotitanate.

<6> The method, according to <4>, for producing the inorganic oxide in the form of the thin film, wherein the zirconium alkoxide includes tetraethyl orthozirconate, tetraisopropyl orthozirconate, or tetra-n-butyl orthozirconate.

<7> The method, according to any one of <1> to <6>, for producing the inorganic oxide in the form of the thin film, wherein the inorganic oxide precursor content of the first liquid is suitably 1% by mass or more, more suitably 5% by mass or more, still more suitably 8% by mass or more, and suitably 80% by mass or less, more suitably 70% by mass or less, still more suitably 60% by mass or less, still further more suitably 50% by mass or less, still further more suitably 40% by mass or less.

<8> The method, according to any one of <1> to <7>, for producing the inorganic oxide in the form of the thin film, wherein the inorganic oxide precursor content is suitably 1% by mass or more and 80% by mass or less, more suitably 5% by mass or more and 70% by mass or less, still more suitably 8% by mass or more and 60% by mass or less, still further more suitably 8% by mass or more and 50% by mass or less, still further more suitably 8% by mass or more and 40% by mass or less.

<9> The method, according to any one of <1> to <8>, for producing the inorganic oxide in the form of the thin film, wherein a solvent of the first liquid includes one or two or more of toluene, hexane, heptane, benzene, and chloroform.

<10> The method, according to any one of <1> to <9>, for producing the inorganic oxide in the form of the thin film, wherein the inorganic-oxide-forming substance content of the second liquid is suitably 0.1% by mass or more, more suitably 0.5% by mass or more, still more suitably 0.8% by mass or more, still further more suitably 1% by mass or more, still further more suitably 5% by mass or more, and suitably 70% by mass or less, more suitably 30% by mass or less, still more suitably 20% by mass or less, still further more suitably 15% by mass or less, still further more suitably 12% by mass or less.

<11> The method, according to any one of <1> to <10>, for producing the inorganic oxide in the form of the thin film, wherein the inorganic-oxide-forming substance content of the second liquid is suitably 0.1% by mass or more and 70% by mass or less, more suitably 0.5% by mass or more and 30% by mass or less, still more suitably 0.8% by mass or more and 20% by mass or less, still further more suitably 1% by mass or more and 15% by mass or less, still further more suitably 5% by mass or more and 12% by mass or less.

<12> The method, according to any one of <1> to <11>, for producing the inorganic oxide in the form of the thin film, wherein a solvent of the second liquid includes one or two or more of an ionic liquid, acetonitrile, and dimethyl sulfoxide.

<13> The method, according to <12>, for producing the inorganic oxide in the form of the thin film, wherein the solvent of the second liquid includes an ionic liquid.

<14> The method, according to <13>, for producing the inorganic oxide in the form of the thin film, wherein cations of the ionic liquid include ammonium cations.

<15> The method, according to <14>, for producing the inorganic oxide in the form of the thin film, wherein the ammonium cations include 1-alkyl-3-alkylimidazolium cations of the following Formula (1).

[Formula 1-2]

(1)

(where $R^1$ is an alkyl group having 12 or less carbon atoms, or a functional group in which one or two or more oxygen atoms are introduced between carbon atomic bonds of an alkyl group so as to form an ether linkage and the total of the number of the carbon atoms and the number of the oxygen atoms is 12 or less; and $R^2$ is an alkyl group having 1 to 4, inclusive, carbon atoms, or a hydrogen atom.)

<16> The method, according to <14> or <15>, for producing the inorganic oxide in the form of the thin film, wherein the ammonium cations include suitably 1-alkyl-3-methylimidazolium cations, more suitably 1-methyl-3-methylimidazolium cations, 1-ethyl-3-methylimidazolium cations, 1-propyl-3-methylimidazolium cations, or 1-butyl-3-methylimidazolium cations.

<17> The method, according to any one of <14> to <16>, for producing the inorganic oxide in the form of the thin film, wherein the ammonium cations include N-alkylpyridium cations of the following Formula (2).

[Formula 2-2]

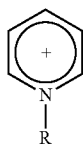
(2)

(where R is an alkyl group having 12 or less carbon atoms, or a functional group in which one or two or more oxygen atoms are introduced between carbon atomic bonds of an alkyl group so as to form an ether linkage, and the total of the number of the carbon atoms and the number of the oxygen atoms is 12 or less).

<18> The method, according to any one of <14> to <17>, for producing the inorganic oxide in the form of the thin film, wherein the ammonium cations include 1-methylpyridium cations, 1-ethylpyridium cations, 1-propylpyridium cations, or 1-butylpyridium cations.

<19> The method, according to any one of <14> to <18>, for producing the inorganic oxide in the form of the thin film, wherein the ammonium cations include cations of the following Formula (3).

$$[NR_xH_{4-x}]^+ \quad (3)$$

(where R is an alkyl group having 12 or less carbon atoms, or a functional group in which one or two or more oxygen atoms are introduced between carbon atomic bonds of an alkyl group so as to form an ether linkage and the total of the number of the carbon atoms and the number of the oxygen atoms is 12 or less; and X is an integer of 0 to 4 inclusive.)

<20> The method, according to any one of <14> to <19>, for producing the inorganic oxide in the form of the thin film, wherein the ammonium cations include N,N,N-triethyl-N-propylammonium cations, tetramethylammonium cations, tetraethylammonium cations, or ethyldimethylpropylammonium cations.

<21> The method, according to any one of <14> to <20>, for producing the inorganic oxide in the form of the thin film, wherein the cations of the ionic liquid include phosphonium cations.

<22> The method, according to <21>, for producing the inorganic oxide in the form of the thin film, wherein the phosphonium cations include cations of the following Formula (4).

$$[PR_xH_{4-x}]^+ \quad (4)$$

(where R is an alkyl group having 12 or less carbon atoms, or a functional group in which one or two or more oxygen atoms are introduced between carbon atomic bonds of an alkyl group so as to form an ether linkage and the total of the number of the carbon atoms and the number of the oxygen atoms is 12 or less; and X is an integer of 0 to 4 inclusive.)

<23> The method, according to <21> or <22>, for producing the inorganic oxide in the form of the thin film, wherein the phosphonium cations include tetramethylphosphonium cations, tetraethylphosphonium cations, or tributylmethylphosphonium cations.

<24> The method, according to any one of <21> to <23>, for producing the inorganic oxide in the form of the thin film, wherein anions of the ionic liquid include bis(trifluoromethylsulfonyl)amide anions ($[(CF_3SO_2)_2N]^-$), ethyl sulfate anions ($[C_2H_5OSO_3]^-$), bis(fluorosulfonyl)amide anions ($[(FSO_2)_2N]^-$), dicyanamide anions ($[(CN)_2N]^-$), tetrafluoroborate anions ($BF_4^-$), hexafluorophosphate anions ($PF_6^-$), halide anions ($Cl^-$, $Br^-$, $I^-$), or trifluoromethanesulfonate anions ($[CF_3SO_3]^-$).

<25> The method, according to any one of <1> to <24>, for producing the inorganic oxide in the form of the thin film, wherein the step is performed by continuous operation.

<26> The method, according to <25>, for producing the inorganic oxide in the form of the thin film, wherein the mode of contact between the first and second liquids includes a mode of supplying moving one of the first and second liquids with the other to bring the liquids into contact with each other.

<27> The method, according to <26>, for producing the inorganic oxide in the form of the thin film, wherein the ratio of the molar movement rate of the inorganic-oxide-forming substance of the second liquid to the molar movement rate of the inorganic oxide precursor of the first liquid at the time of contact between the first and second liquids is suitably 2 or more, more suitably 10 or more, still more suitably 50 or more, and suitably 300 or less, more suitably 200 or less, still more suitably 150 or less.

<28> The method, according to <26> or <27>, for producing the inorganic oxide in the form of the thin film, wherein the ratio of the molar movement rate of the inorganic-oxide-forming substance of the second liquid to the molar movement rate of the inorganic oxide precursor of the first liquid at the time of contact between the first and second liquids is suitably 2 or more and 300 or less, more suitably 10 or more and 200 or less, still more suitably 50 or more and 150 or less.

<29> The method, according to any one of <26> to <28>, for producing the inorganic oxide in the form of the thin film, wherein the mode of contact between the first and second liquids includes a mode of supplying flowing one of the first and second liquids with the other to bring the liquids into contact with each other.

<30> The method, according to <29>, for producing the inorganic oxide in the form of the thin film, wherein, when the first liquid is allowed to flow, the linear flow velocity of the first liquid at the time of contact between the first and second liquids is suitably 0.0001 m/s or more, more suitably 0.005 m/s or more, still more suitably 0.01 m/s or more, still further more suitably 0.03 m/s or more, still further more suitably 0.05 m/s or more, still further more suitably 0.1 m/s or more, and suitably 100 m/s or less, more suitably 20 m/s or less, still more suitably 10 m/s or less, still further more suitably 5 m/s or less, still more suitably 3 m/s or less, still more suitably 1 m/s or less.

<31> The method, according to <29> or <30>, for producing the inorganic oxide in the form of the thin film, wherein, when the first liquid is allowed to flow, the linear flow velocity of the first liquid at the time of contact between the first and second liquids is suitably 0.0001 m/s or more and 100 m/s or less, more suitably 0.005 m/s or more and 20 m/s or less, still more suitably 0.01 m/s or more and 10 m/s or less, still further more suitably 0.03 m/s or more and 5 m/s or less, still further more suitably 0.05 m/s or more and 3 m/s or less, still further more suitably 0.1 m/s or more and 1 m/s or less.

<32> The method, according to any one of <29> to <31>, for producing the inorganic oxide in the form of the thin film, wherein, when the second liquid is allowed to flow, the linear flow velocity of the second liquid at the time of contact between the first and second liquids is suitably 0.001 m/s or more, more suitably 0.005 m/s or more, still more suitably 0.01 m/s or more, still further more suitably 0.03 m/s or more, still further more suitably 0.05 m/s or more, still more suitably 0.1 m/s or more, and suitably 100 m/s or less, more suitably 20 m/s or less, still more suitably 10 m/s or less, still further more suitably 5 m/s or less, still further more suitably 3 m/s or less, still further more suitably 1 m/s or less.

<33> The method, according to any one of <29> to <32>, for producing the inorganic oxide in the form of the thin film, wherein, when the second liquid is allowed to flow, the linear flow velocity of the second liquid at the time of contact between the first and second liquids is suitably 0.001 m/s or more and 100 m/s or less, more suitably 0.005 m/s or more and 20 m/s or less, still further more suitably 0.01 m/s or more and 10 m/s or less, still further more suitably 0.03 m/s or more and 5 m/s or less, still further more suitably 0.05 m/s or more and 3 m/s or less, still further more suitably 0.1 m/s or more and 1 m/s or less.

<34> The method, according to any one of <29> to <33>, for producing the inorganic oxide in the form of the thin film, wherein, when the first liquid is allowed to flow, the first liquid flows under a laminar flow condition until the time when the first and second liquids come into contact with each other.

<35> The method, according to any one of <29> to <34>, for producing the inorganic oxide in the form of the thin film, wherein, when the first liquid is allowed to flow, the Reynolds number of the first liquid until the time when the first and second liquids come into contact with each other is suitably 0.1 or more, more suitably 5 or more, still more suitably 10 or more, and suitably 1500 or less, more suitably 500 or less, still more suitably 300 or less.

<36> The method, according to any one of <29> to <35>, for producing the inorganic oxide in the form of the thin film, wherein, when the first liquid is allowed to flow, the Reynolds number of the first liquid until the time when the first and second liquids come into contact with each other is suitably 0.1 or more and 1500 or less, more suitably 5 or more and 500 or less, still more suitably 10 or more and 300 or less.

<37> The method, according to any one of <29> to <36>, for producing the inorganic oxide in the form of the thin film, wherein, when the second liquid is allowed to flow, the second liquid flows under a laminar flow condition until the time when the first and second liquids come into contact with each other.

<38> The method, according to any one of <29> to <37>, for producing the inorganic oxide in the form of the thin film, wherein, when the second liquid is allowed to flow, the Reynolds number of the second liquid until the time when the first and second liquids come into contact with each other is suitably 0.01 or more, more suitably 0.5 or more, still more suitably 1 or more, and suitably 500 or less, more suitably 200 or less, still more suitably 100 or less.

<39> The method, according to any one of <29> to <38>, for producing the inorganic oxide in the form of the thin film, wherein, when the second liquid is allowed to flow, the Reynolds number of the second liquid until the time when the first and second liquids come into contact with each other is suitably 0.01 or more and 500 or less, more suitably 0.5 or more and 200 or less, still more suitably 1 or more and 100 or less.

<40> The method, according to any one of <29> to <39>, for producing the inorganic oxide in the form of the thin film, wherein the mode of contact between the first and second liquids includes a mode of causing both of the first and second liquids to flow and join together.

<41> The method, according to <40>, for producing the inorganic oxide in the form of the thin film, wherein the mode of contact between the first and second liquids includes a mode of allowing one of the first and second liquids to have contact with the other from behind at an angle with respect to the flow direction of the one, and subsequently allowing the liquids to flow in the flow direction of the one.

<42> The method, according to <41>, for producing the inorganic oxide in the form of the thin film, wherein an angle θ which the flow direction of the one forms with the flow direction of the other is suitably 90° or less, more suitably 60° or less, still more suitably 45° or less.

<43> The method, according to any one of <40> to <42>, for producing the inorganic oxide in the form of the thin film, wherein the manner of supplying one of the first and second liquids with the other is a manner of allowing both of the first and second liquids to flow out of slits and join together.

<44> The method, according to any one of <40> to <43>, for producing the inorganic oxide in the form of the thin film, wherein the mode of contact between the first and second liquids includes a mode of allowing both of the first and second liquids to flow in the same direction, and, while maintaining the flow direction, bringing the first and second liquids into contact with each other.

<45> The method, according to <44>, for producing the inorganic oxide in the form of the thin film, wherein the manner of supplying one of the first and second liquids with the other is a manner of allowing the one to flow between an inner pipe and an outer pipe of a double pipe while allowing the other to flow through the inner pipe, and causing the liquids to join together so as to cover the other with the one.

<46> The method, according to any one of <40> to <45>, for producing the inorganic oxide in the form of the thin film, wherein the ratio of the linear flow velocity of the first liquid to the linear flow velocity of the second liquid at the time of contact between the first and second liquids is suitably 0.01 or more, more suitably 0.1 or more, still more suitably 0.5 or more, and suitably 100 or less, more suitably 60 or less, still more suitably 10 or less.

<47> The method, according to any one of <40> to <46>, for producing the inorganic oxide in the form of the thin film, wherein the ratio of the linear flow velocity of the first liquid to the linear flow velocity of the second liquid at the time of contact between the first and second liquids is suitably 0.01 or more and 100 or less, more suitably 0.1 or more and 60 or less, still more suitably 0.5 or more and 10 or less.

<48> The method, according to any one of <40> to <47>, for producing the inorganic oxide in the form of the thin film, wherein the ratio of the Reynolds number of the first liquid to the Reynolds number of the second liquid until the time when the first and second liquids come into contact with each other is suitably 0.01 or more, more suitably 0.1 or more, still more suitably 1 or more, still further more suitably 5 or more, still further more suitably 10 or more, still further more suitably 15 or more, and suitably 1000 or less, more suitably 500 or less, still more suitably 200 or less, still further more suitably 100 or less, still further more suitably 50 or less, still further more suitably 30 or less, still further more suitably 25 or less.

<49> The method, according to any one of <40> to <48>, for producing the inorganic oxide in the form of the thin film, wherein the ratio of the Reynolds number of the first liquid to the Reynolds number of the second liquid until the time when the first and second liquids come into contact with each other is suitably 0.01 or more and 1000 or less, more suitably 0.1 or more and 500 or less, still more suitably 1 or more and 200 or less, still further more suitably 5 or more and 100 or less, still further more suitably 10 or more and 50 or less, still further more suitably 15 or more and 30 or less, still further more suitably 15 or more and 25 or less.

<50> The method, according to any one of <29> to <49>, for producing the inorganic oxide in the form of the thin film, wherein the mode of contact between the first and second liquids includes a mode of allowing only one of the first and second liquids to flow.

<51> The method, according to any one of <26> to <50>, for producing the inorganic oxide in the form of the thin film, wherein the mode of contact between the first and second liquids includes a mode of supplying transported one of the first and second liquids with the other to bring the liquids into contact with each other.

<52> The method, according to any one of <25> to <51>, for producing the inorganic oxide in the form of the thin film, wherein the mode of contact between the first and second liquids includes a mode of supplying staying-still one of the first and second liquids with the other to bring the liquids into contact with each other while moving the other.

<53> The method, according to any one of <1> to <52>, for producing the inorganic oxide in the form of the thin film, wherein the segment size of the first liquid at the time of contact between the first and second liquids is suitably 5 µm or larger, more suitably 10 µm or larger, still more suitably 15 µm or larger, still further more suitably 30 µm or larger, still further more suitably 50 µm or larger, still further more suitably 100 µm or larger, and suitably 450 µm or smaller, more suitably 350 µm or smaller, still more suitably 300 µm or smaller, still further more suitably 250 µm or smaller, still further more suitably 200 µm or smaller.

<54> The method, according to any one of <1> to <53>, for producing the inorganic oxide in the form of the thin film, wherein the segment size of the first liquid at the time of contact between the first and second liquids is suitably 5 µm or larger and 450 µm or smaller, more suitably 10 µm or larger and 350 µm or smaller, still more suitably 15 µm or larger and 300 µm or smaller, still further more suitably 30 µm or larger and 250 µm or smaller, still further more suitably 50 µm or larger and 200 µm or smaller, still further more suitably 100 µm or larger and 200 µm or smaller.

<55> The method, according to any one of <1> to <54>, for producing the inorganic oxide in the form of the thin film, wherein the segment size of the second liquid at the time of contact between the first and second liquids is suitably 5 µm or larger, more suitably 20 µm or larger, still more suitably 50 µm or larger, still further more suitably 80 µm or larger, still further more suitably 100 µm or larger, and suitably 20 mm or smaller, more suitably 10 mm or smaller, still more suitably 5 mm or smaller, still further more suitably 1 mm or smaller, still further more suitably 500 µm or smaller.

<56> The method, according to any one of <1> to <55>, for producing the inorganic oxide in the form of the thin film, wherein the segment size of the second liquid at the time of contact between the first and second liquids is suitably 5 µm or larger and 20 mm or smaller, more suitably 20 µm or larger and 10 mm or smaller, still more suitably 50 µm or larger and 5 mm or smaller, still further more suitably 80 µm or larger and 1 mm or smaller, still further more suitably 100 µm or larger and 500 µm or smaller.

<57> The method, according to any one of <1> to <56>, for producing the inorganic oxide in the form of the thin film, wherein the segment size of the first liquid at the time of contact between the first and second liquids is equal to the segment size of the second liquid, or smaller than the segment size of the second liquid.

<58> The method, according to any one of <1> to <57>, for producing the inorganic oxide in the form of the thin film, wherein the ratio of the segment size of the second liquid to the segment size of the first liquid at the time of contact between the first and second liquids is suitably 0.1 or more, more suitably 0.5 or more, still more suitably 1.0 or more, and suitably 500 or less, more suitably 100 or less, still more suitably 20 or less.

<59> The method, according to any one of <1> to <58>, for producing the inorganic oxide in the form of the thin film, wherein the ratio of the segment size of the second liquid to the segment size of the first liquid at the time of contact between the first and second liquids is suitably 0.1 or more and 500 or less, more suitably 0.5 or more and 100 or less, still more suitably 1.0 or more and 20 or less.

<60> The method, according to any one of <1> to <59>, for producing the inorganic oxide in the form of the thin film, wherein the contact of the first and second liquids is established in a state in which a gas phase is not present and accordingly a free interface is not present.

<61> The method, according to any one of <1> to <60>, for producing the inorganic oxide in the form of the thin film, wherein the contact of the first and second liquids is realized in a state in which a gas phase is present, and a free interface is present, accordingly.

<62> The method, according to any one of <1> to <61>, for producing the inorganic oxide in the form of the thin film, wherein the duration of contact between the first and second liquids is suitably 0.5 sec or longer, more suitably 1.5 sec or longer, still more suitably 2.0 sec or longer, and suitably 600 sec or shorter, more suitably 180 sec or shorter, still more suitably 100 sec or shorter, still further more suitably 50 sec or shorter, still further more suitably 10 sec or shorter.

<63> The method, according to any one of <1> to <62>, for producing the inorganic oxide in the form of the thin film, wherein the duration of contact between the first and second liquids is suitably 0.5 sec or longer and 600 sec or shorter, more suitably 1.5 sec or longer and 180 sec or shorter, still more suitably 2.0 sec or longer and 100 sec or shorter, still further more suitably 2.0 sec or longer and 50 sec or shorter, still further more suitably 2.0 sec or longer and 10 sec or shorter.

<64> The method, according to any one of <1> to <63>, for producing the inorganic oxide in the form of the thin film, wherein the reaction temperature at the time of contact between the first and second liquids is suitably 10° C. or higher, more suitably 20° C. or higher, and suitably 60° C. or lower, more suitably 40° C. or lower.

<65> The method, according to any one of <1> to <64>, for producing the inorganic oxide in the form of the thin film, wherein the reaction temperature at the time of contact between the first and second liquids is suitably 10° C. or higher and 60° C. or lower, more suitably 20° C. or higher and 40° C. or lower.

<66> The method, according to any one of <1> to <65>, for producing the inorganic oxide in the form of the thin film, wherein an interfacial tension of the first liquid to the second liquid at a temperature at the time of contact between the first and second liquids is suitably 0.1 mN/m or more, more suitably 0.5 mN/m or more, still more suitably 1 mN/m or more, and suitably 30 mN/m or less, more suitably 15 mN/m or less, still more suitably 10 mN/m or less.

<67> The method, according to any one of <1> to <66>, for producing the inorganic oxide in the form of the thin film, wherein an interfacial tension of the first liquid to the second liquid at a temperature at the time of contact between the first and second liquids is suitably 0.1 mN/m or more and 30 mN/m or less, more suitably 0.5 mN/m or more and 15 mN/m or less, still more suitably 1 mN/m or more and 10 mN/m or less.

<68> The method, according to any one of <1> to <67>, for producing the inorganic oxide in the form of the thin film, wherein the average longitudinal diameter of the inorganic oxide in the form of the thin film is suitably 2 μm or larger, more suitably 5 μm or larger, still more suitably 10 μm or larger, and suitably 300 μm or smaller, more suitably 100 μm or smaller, still more suitably 50 μm or smaller.

<69> The method, according to any one of <1> to <68>, for producing the inorganic oxide in the form of the thin film, wherein the average longitudinal diameter is suitably 2 μm or larger and 300 μm or smaller, more suitably 5 μm or larger and 100 μm or smaller, still more suitably 10 μm or larger and 50 μm or smaller.

<70> The method, according to any one of <1> to <69>, for producing the inorganic oxide in the form of the thin film, wherein the average thickness of the inorganic oxide in the form of the thin film is suitably 0.01 μm or larger, more suitably 0.05 μm or larger, still more suitably 0.1 μm or larger, and suitably 1.5 μm or smaller, more suitably 1 μm or smaller, still more suitably 0.8 μm or smaller, still more suitably 0.5 μm or smaller, still more suitably 0.4 μm or smaller, still more suitably 0.3 μm or smaller.

<71> The method, according to any one of <1> to <70>, for producing the inorganic oxide in the form of the thin film, wherein the average thickness of the inorganic oxide in the form of the thin film is suitably 0.01 μm or larger and 1.5 μm or smaller, more suitably 0.05 μm or larger and 1 μm or smaller, still more suitably 0.1 μm or larger and 0.8 μm or smaller, still further more suitably 0.1 μm or larger and 0.5 μm or smaller, still further more suitably 0.1 μm or larger and 0.4 μm or smaller, still further more suitably 0.1 μm or larger and 0.3 μm or smaller.

<72> The method, according to any one of <1> to <71>, for producing the inorganic oxide in the form of the thin film, wherein the ratio of the average longitudinal diameter of the inorganic oxide in the form of the film to the average thickness thereof is suitably 5 or more, more suitably 30 or more, still more suitably 50 or more, and suitably 2000 or less, more suitably 800 or less, still more suitably 500 or less.

<73> The method, according to any one of <1> to <72>, for producing the inorganic oxide in the form of the thin film, wherein the ratio of the average longitudinal diameter of the inorganic oxide in the form of the film to the average thickness thereof is suitably 5 or more and 2000 or less, more suitably 30 or more and 800 or less, still more suitably 50 or more and 500 or less.

EXAMPLES

First Example

Figure 14A:
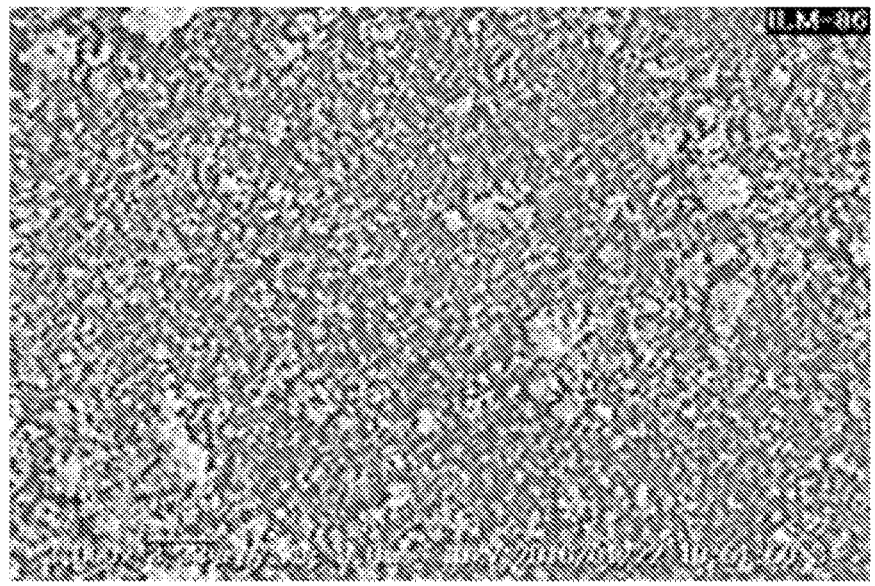
FIGS. 14A-14B are photographs of metal oxides obtained from Comparative Example 1-1 to 1-2 observed using a microscope.
Figure 14B:
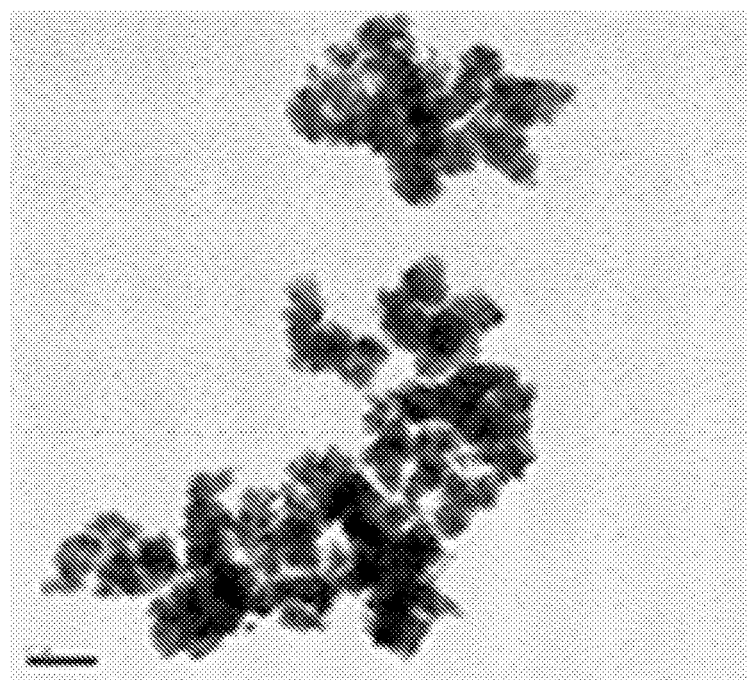

Metal oxides of the following Examples 1-1 to 1-7 as shown in FIGS. 13A-13G and Comparative Examples 1-1 to 1-2 as shown in FIGS. 14A-14B were produced. In each of Examples 1-1 to 1-7 and Comparative Example 1-2, an interfacial tension of the first liquid L1 to the second liquid L2 at 25° C. was measured using a Wilhelmy type interfacial tensiometer. Furthermore, the average longitudinal diameter of the metal oxide in the form of the thin film obtained in each of Examples 1-1 to 1-7 was determined as the average of longitudinal diameters of 500 data points measured by microscopic observation. The average thickness was determined as the average thickness of the cross-sections of 20 pieces obtained by cutting the inorganic oxide in the form of the film and measured by microscopic observation. From the results, the ratio of the average longitudinal diameter to the average thickness was determined. Tables 1 and 2 show the results. FIGS. 13A-13G and FIGS. 14A-14B show the metal oxides obtained in Examples and Comparative Examples, respectively.

Example 1-1

Using the system S for producing an inorganic oxide gel in the form of a thin film, the system S including the substrate-laminated microreactor 100 disclosed in the above-mentioned embodiment, a titanium oxide in the form of a thin film was produced.

As the first liquid L1, a hexane solution containing 8.0% by mass of Ti(OBu)$_4$ serving as an inorganic oxide precursor was prepared. Furthermore, as the second liquid L2, an ionic liquid solution containing 10% by mass of water serving as an inorganic-oxide-forming substance and having Emim cations and ES anions was prepared.

The first liquid L1 and the second liquid L2 were fed into the first storage tank 211 and the second storage tank 212, respectively, and these liquids were supplied to the substrate-laminated microreactor 100 by continuous operation to obtain a slurry containing a titanium oxide gel in the form of a thin film. At this time, the opening widths 61 and 62 of the respective first and second slits 119a and 119b inside the microreactor 100 were both 130 μm, and accordingly, the segment size $S_1$ of the first liquid L1 and the segment size $S_2$ of the second liquid L2 at the time of contact between the first liquid L1 and the second liquid L2 were both 130 μm. The flow rate $Q_1$ of the first liquid L1 was 39 mL/min, the linear velocity $u_1$ of the first liquid L1 at the time of contact between the first liquid L1 and the second liquid L2 was 0.05 m/s, and the Reynolds number $Re_1$ of the first liquid L1 until the time when the first liquid L1 and the second liquid L2 came into contact with each other was 14. The flow rate $Q_2$ of the second liquid L2 was 39 mL/min, the linear velocity $u_2$ of the second liquid L2 at the time of contact between the first liquid L1 and the second liquid L2 was 0.05 m/s, and the Reynolds number $Re_2$ of the second liquid L2 until the time when the first liquid L1 and the second liquid L2 came into contact with each other was 0.14. The temperature (reaction temperature) of the first liquid L1 and the second liquid L2 was 25° C. The duration of contact (duration of reaction) between the first liquid L1 and the second liquid L2 at the liquid contact portion 118 was 3 seconds. An angle θ that the flow direction of the first liquid L1 formed with the flow direction of the second liquid L2 was 10°.

The obtained slurry was filtered using a metal mesh, and the titanium oxide gel in the form of the thin film remaining on the metal mesh was washed with ethanol, and subsequently dried and baked to obtain a solid titanium oxide in the form of a thin film.

Example 1-2

Using the system S for producing an inorganic oxide gel in the form of a thin film, the system S including the double pipe microreactor 100 disclosed in the above-mentioned embodiment, a titanium oxide in the form of a thin film was produced.

As the first liquid L1, a toluene solution containing 30% by mass of Ti(OBu)$_4$ serving as an inorganic oxide precursor was prepared. Furthermore, as the second liquid L2, an ionic liquid solution containing 1.0% by mass of water serving as an inorganic-oxide-forming substance and having Bmim cations and NTf2 anions was prepared.

The first liquid L1 and the second liquid L2 were fed into the first storage tank 211 and the second storage tank 212, respectively, and these liquids were supplied to the double pipe microreactor 100 by continuous operation to obtain a slurry containing a titanium oxide gel in the form of a thin film. At this time, the inner diameter of the inner pipe 121 of the microreactor 100 was 170 μm, and accordingly, the segment size $S_1$ of the first liquid L1 at the time of contact between the first liquid L1 and the second liquid L2 was 170 μm. The flow rate $Q_1$ of the first liquid L1 was 0.14 mL/min, the linear velocity $u_1$ of the first liquid L1 at the time of contact between the first liquid L1 and the second liquid L2 was 0.11 m/s, and the Reynolds number $Re_1$ of the first liquid L1 until the time when the first liquid L1 and the second liquid L2 came into contact with each other was 27. The inner diameter of the outer pipe 122 of the microreactor 100 was 2.4 mm and the outer diameter of the inner pipe 121 of the microreactor 100 was 1.6 mm, and accordingly, the segment size $S_2$ of the second liquid L2 at the time of contact between the first liquid L1 and the second liquid L2 was 0.4 mm. The flow rate $Q_2$ of the second liquid L2 was 10.4 mL/min, the linear velocity $u_2$ of the second liquid L2 at the time of contact between the first liquid L1 and the second liquid L2 was 0.07 m/s, and the Reynolds number $Re_2$ of the second liquid L2 until the time when the first liquid L1 and the second liquid L2 came into contact with each other was 2. The temperature (reaction temperature) of the first liquid L1 and the second liquid L2 was 25° C. The duration of contact (duration of reaction) between the first liquid L1 and the second liquid L2 at the liquid contact portion 123 was 3 seconds.

The obtained slurry was filtered using a metal mesh, and the titanium oxide gel in the form of the thin film remaining on the metal mesh was washed with ethanol, and subsequently dried and baked to obtain a solid titanium oxide in the form of a thin film.

Example 1-3

A solid titanium oxide in the form of a thin film was obtained in the same manner as in Example 1-2, except that, as the first liquid L1, a hexane solution containing 20% by mass of Ti(OBu)$_4$ serving as an inorganic oxide precursor was used.

Example 1-4

A solid titanium oxide in the form of a thin film was obtained in the same manner as in Example 1-2, except that the flow rate $Q_1$ of the first liquid L1 was 0.48 mL/min, the linear velocity $u_1$ of the first liquid L1 at the time of contact between the first liquid L1 and the second liquid L2 was 0.35 m/s, and the Reynolds number $Re_1$ of the first liquid L1 until the time when the first liquid L1 and the second liquid L2 came into contact with each other was 87, and furthermore, the flow rate $Q_2$ of the second liquid L2 was 34.7 mL/min, the linear velocity $u_2$ of the second liquid L2 at the time of contact between the first liquid L1 and the second liquid L2 was 0.2 m/s, and the Reynolds number $Re_2$ of the second liquid L2 until the time when the first liquid L1 and the second liquid L2 came into contact with each other was 5.

Example 1-5

A solid titanium oxide in the form of a thin film was obtained in the same manner as in Example 1-3, except that, as the second liquid L2, an acetonitrile solution containing 1.8% by mass of water serving as an inorganic-oxide-forming substance was used. The Reynolds number $Re_2$ of the second liquid L2 was 124.

Example 1-6

A solid titanium oxide in the form of a thin film was obtained in the same manner as in Example 1-3, except that the flow rate $Q_1$ of the first liquid L1 was 5.2 mL/min, the linear velocity $u_1$ of the first liquid L1 at the time of contact between the first liquid L1 and the second liquid L2 was 3.8 m/s, and the Reynolds number $Re_1$ of the first liquid L1 until the time when the first liquid L1 and the second liquid L2 came into contact with each other was 1439, and furthermore, as the second liquid L2, an ionic liquid solution containing 1.2% by mass of water serving as an inorganic-oxide-forming substance and having Emim cations and ES anions was used.

Example 1-7

A solid zirconium oxide in the form of a thin film was obtained in the same manner as in Example 1-2, except that, as the first liquid L1, a hexane solution containing 30% by mass of $Zr(OBu)_4$ serving as an inorganic oxide precursor was used, and furthermore, as the second liquid L2, an ionic liquid solution containing 0.9% by mass of water serving as an inorganic-oxide-forming substance and having Bmim cations and NTf2 anions was used.

Comparative Example 1-1

A solid spherical titanium oxide was obtained in the same manner as in Example 1-3, except that, as the second liquid L2, a methanol solution containing 1.8% by mass of water serving as an inorganic-oxide-forming substance and being compatible with hexane was used. The Reynolds number $Re_1$ of the first liquid L1 and the Reynolds number $Re_2$ of the second liquid L2 until the time when the first liquid L1 and the second liquid L2 came into contact with each other were 42 and 220, respectively. The Reynolds number $Re_1$ of the first liquid L1 and the Reynolds number $Re_2$ of the second liquid L2 at the time when the liquids were compatible with each other after the contact were 220.

Comparative Example 1-2

As the first liquid L1, a toluene solution containing 30% by mass of $Ti(OBu)_4$ serving as an inorganic oxide precursor was prepared. As the second liquid L2, an ionic liquid solution containing 0.2% by mass of water serving as an inorganic-oxide-forming substance and having Bmim cations and NTf2 anions was prepared.

The second liquid L2 prepared in a vessel was left standing for 30 minutes, and subsequently, the first liquid L1 was added from above onto the second liquid L2 in the vessel without ruffling the surface of the second liquid L2, and the mixture was left standing for 30 minutes to cause an interface reaction, whereby a slurry containing a spherical gel was obtained. The temperature (reaction temperature) of the first liquid L1 and the second liquid L2 was 25° C. The segment size of the first liquid L1 at the time of contact between the first liquid L1 and the second liquid L2 was calculated by dividing a liquid volume of the first liquid L1 by a cross-sectional area of the vessel, and the result was 640 µm.

The obtained slurry was filtered using a metal mesh, and the spherical gel remaining on the metal mesh was washed with ethanol, and subsequently dried and baked to obtain a solid spherical titanium oxide.

TABLE 1

| | | Example | | | | | | |
|---|---|---|---|---|---|---|---|---|
| | | 1-1 | 1-2 | 1-3 | 1-4 | 1-5 | 1-6 | 1-7 |
| First Liquid | Solvent | Hexane | Toluene | Hexane | Toluene | Hexane | Hexane | Hexane |
| | Inorganic Oxide Precursor | $Ti(OBu)_4$ | $Ti(OBu)_4$ | $Ti(OBu)_4$ | $Ti(OBu)_4$ | $Ti(OBu)_4$ | $Ti(OBu)_4$ | $Zr(OBu)_4$ |
| | Inorganic Oxide Precursor Content $c_1$ (% by mass) | 8.0 | 30 | 20 | 30 | 20 | 20 | 30 |
| | Segment Size $S_1$ (µm) | 130 | 170 | 170 | 170 | 170 | 170 | 170 |
| | Flow Rate $Q_1$ (mL/min) | 39 | 0.14 | 0.14 | 0.48 | 0.14 | 5.2 | 0.14 |
| | Linear Velocity $u_1$ (m/s) | 0.05 | 0.11 | 0.11 | 0.35 | 0.11 | 3.8 | 0.11 |
| | Reynolds Number $Re_1$ | 14 | 27 | 42 | 87 | 42 | 1439 | 42 |
| Second Liquid | Solvent | EmimES | BmimNTf2 | BmimNTf2 | BmimNTf2 | Acetonitrile | EmimES | BmimNTf2 |
| | Inorganic-oxide-forming Substance | Water | Water | Water | Water | Water | Water | Water |
| | Inorganic-oxide-forming Substance Content $c_2$ (% by mass) | 10 | 1.0 | 1.0 | 1.0 | 1.8 | 1.2 | 0.9 |
| | Segment Size $S_2$ (µm) | 130 | 400 | 400 | 400 | 400 | 400 | 400 |
| | Flow Rate $Q_2$ (mL/min) | 39 | 10.4 | 10.4 | 34.7 | 10.4 | 10.4 | 10.4 |
| | Linear Velocity $u_2$ (m/s) | 0.05 | 0.07 | 0.07 | 0.2 | 0.07 | 0.07 | 0.07 |
| | Reynolds Number $Re_2$ | 0.14 | 2 | 2 | 5 | 124 | 2 | 2 |
| Interfacial Tension of First Liquid to Second Liquid (mN/m) | | 8.8 | 1.2 | 8.8 | 1.2 | 3.4 | 15.1 | 8.8 |
| $m_2/m_1$ (Molar Movement Rate Ratio) | | 45 | 76 | 147 | 76 | 147 | 4 | 76 |
| $S_2/S_1$ | | 1.0 | 2.35 | 2.35 | 2.35 | 2.35 | 2.35 | 2.35 |
| $u_1/u_2$ | | 1.0 | 1.6 | 1.6 | 1.8 | 1.6 | 54 | 1.6 |
| $Re_1/Re_2$ | | 100 | 14 | 21 | 17 | 0.34 | 720 | 21 |
| Microreactor | | Substrate-laminated Type FIGS. 11A to 11E | Double Pipe Type FIGS. 12A to 12B | Double Pipe Type FIGS. 12A to 12B | Double Pipe Type FIGS. 12A to 12B | Double Pipe Type FIGS. 12A to 12B | Double Pipe Type FIGS. 12A to 12B | Double Pipe Type FIGS. 12A to 12B |
| Reaction Temperature (C. °) | | 25 | 25 | 25 | 25 | 25 | 25 | 25 |
| Contact Duration (Reaction Duration) (s) | | 3 | 3 | 3 | 3 | 3 | 3 | 3 |
| Metal Oxide Form | | Thin Film Form | Thin Film Form | Thin Film Form | Thin Film Form | Thin Film Form | Thin Film Form | Thin Film Form |
| Average Longitudinal Diameter (µm) | | 32 | 41 | 10 | 39 | 31 | 30 | 38 |

TABLE 1-continued

| | Example | | | | | | |
|---|---|---|---|---|---|---|---|
| | 1-1 | 1-2 | 1-3 | 1-4 | 1-5 | 1-6 | 1-7 |
| Average Thickness (μm) | 0.35 | 0.38 | 0.15 | 0.31 | 0.73 | 0.47 | 0.11 |
| Average Longitudinal Diameter/ Average Thickness | 91 | 108 | 67 | 126 | 42 | 64 | 345 |

TABLE 2

| | | Comparative Example | |
|---|---|---|---|
| | | 1-1 | 1-2 |
| First Liquid | Solvent | Hexane | Toluene |
| | Inorganic Oxide Precursor | $Ti(OBu)_4$ | $Ti(OBu)_4$ |
| | Inorganic Oxide Precursor Content $c_1$ (% by mass) | 20 | 30 |
| | Segment Size $S_1$ (μm) | 170 | 640 |
| | Flow Rate $Q_1$ (mL/min) | 0.14 | — |
| | Linear Velocity $u_1$ (m/s) | 0.11 | — |
| | Reynolds Number $Re_1$ | 42 | — |
| Second Liquid | Solvent | Methanol | BmimNTf2 |
| | Inorganic-oxide-forming Substance | Water | Water |
| | Inorganic-oxide-forming Substance Content $c_2$ (% by mass) | 1.8 | 0.2 |
| | Segment Size S2 (μm) | 400 | — |
| | Flow Rate $Q_2$ (mL/min) | 10.4 | — |
| | Linear Velocity $u_2$ (m/s) | 0.07 | — |
| | Reynolds Number $Re_2$ | 220 | — |
| Interfacial Tension of First Liquid to Second Liquid (mN/m) | | — | 1.2 |
| $m_2/m_1$ (Molar Movement Rate Ratio) | | 147 | — |
| $S_2/S_1$ | | 13.0 | — |
| $u_1/u_2$ | | 1.6 | — |
| $Re_1/Re_2$ | | 0.19 | — |
| Microreactor | | Double Pipe Type FIGS. 12A to 12B | — |
| Reaction Temperature (° C.) | | 25 | 25 |
| Contact Duration (Reaction Duration) (s) | | 3 | — |
| Metal Oxide Form | | Spherical Form | Spherical Form |

In Examples 1-1 to 1-7 as shown in FIGS. 13A-13G, a titanium oxide gel in the form of a film and a zirconium oxide gel in the form of a film were continuously and stably formed with high selectivity, and hence, compared with the arts disclosed in Patent Documents 1 and 2, the titanium oxide in the form of the thin film and the zirconium oxide in the form of the thin film were produced with higher production efficiency. In contrast, a titanium oxide in the form of a thin film was not obtained in Comparative Examples 1-1 to 1-2 as shown in FIGS. 14A-14B.

Second Example

Figure 15A:
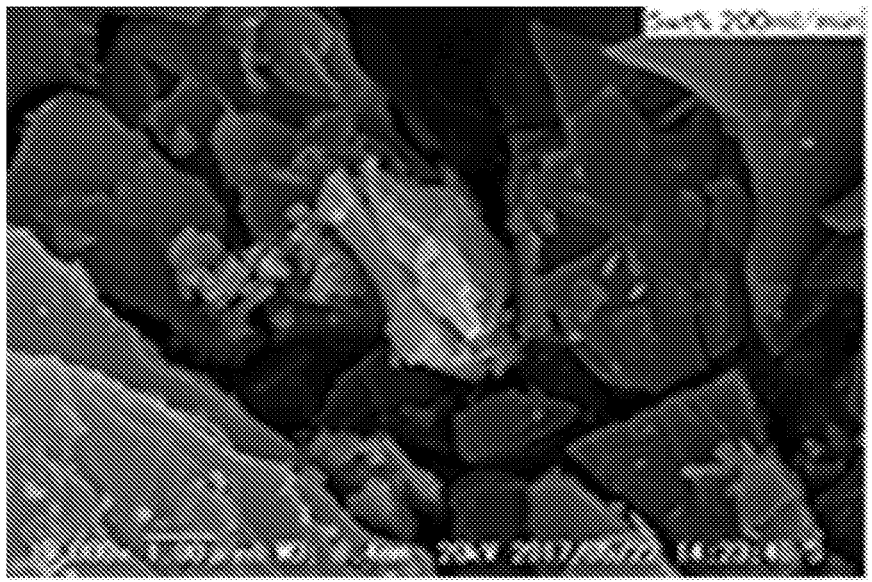
FIGS. 15A-15C are photographs of titanium oxides obtained from Second Example observed using a microscope.
Figure 15B:
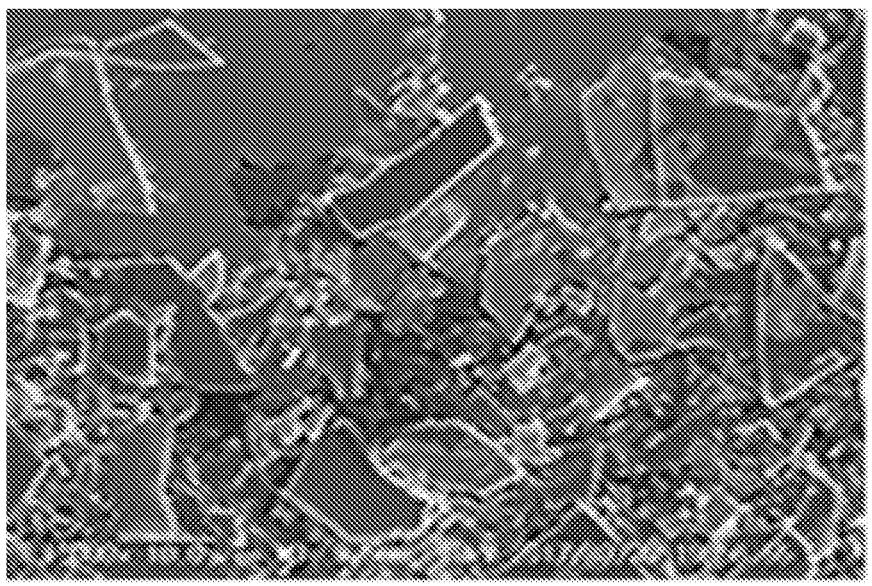
Figure 15C:
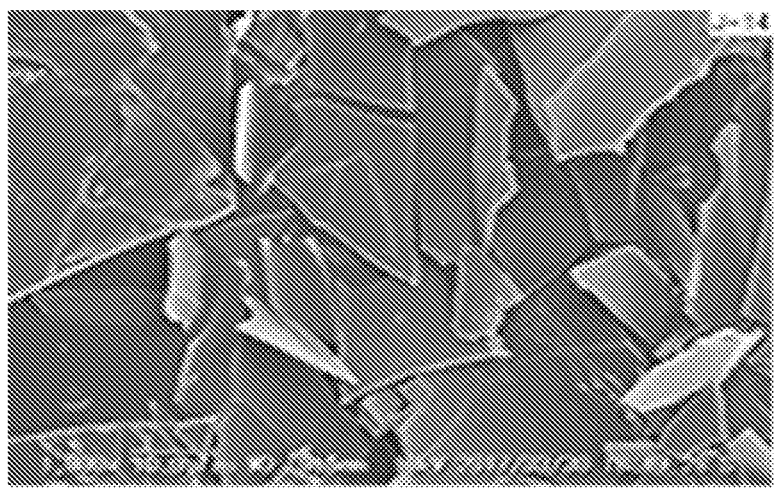

Using a liquid tank 30 illustrated in FIG. 3A, the first liquid L1 and the second liquid L2 were brought into contact with each other by continuous operation to produce a titanium oxide in the form of a thin film in each of the following Examples 2-1 to 2-3 as shown in FIGS. 15A-15C. In each of Examples 2-1 to 2-3, the interfacial tension of the first liquid L1 to the second liquid L2 at 25° C. was measured using a Wilhelmy type interfacial tensiometer. Furthermore, the average thickness of the obtained titanium oxide in the form of the thin film was determined in the same manner as in First Example. Table 3 shows the results, and FIGS. 15A-15C shows the obtained titanium oxides in the form of the thin film.

Example 2-1

As the first liquid L1, a hexane solution containing 5.0% by mass of $Ti(OBu)_4$ serving as an inorganic oxide precursor was prepared. Furthermore, as the second liquid L2, an ionic liquid solution containing 10% by mass of water serving as an inorganic-oxide-forming substance and having Emim cations and ES anions was prepared.

The second liquid L2 was allowed to flow while circulating in the liquid tank 30, and the first liquid L1 was supplied onto a surface of the second liquid L2 from a microsyringe, and thus a slurry containing a titanium oxide gel in the form of a thin film was obtained. At this time, the segment size $S_1$ of the first liquid L1 and the segment size $S_2$ of the second liquid L2 at the time of contact between the first liquid L1 and the second liquid L2 are 9.2 μm and 2800 μm, respectively, which are respectively equivalent to layer thicknesses at the cross-sections perpendicular to the flow direction of the liquids in a state in which a liquid laminated structure is formed by supplying the first liquid L1 onto the surface of the flowing second liquid L2. The flow rate $Q_2$ of the second liquid L2 was 200 mL/min, the linear velocity $u_2$ of the second liquid L2 was 0.012 m/s, and the Reynolds number $Re_2$ of the second liquid L2 was 5.1. The flow rate $Q_1$ of the first liquid L1 was 0.66 mL/min. The temperature (reaction temperature) of the first liquid L1 and the second liquid L2 was 25° C. The duration of contact (duration of reaction) between the first liquid L1 and the second liquid L2 was 13 seconds.

The obtained slurry was filtered using a metal mesh, and the titanium oxide gel in the form of the thin film remaining on the metal mesh was washed with ethanol, and subsequently dried and baked to obtain a solid titanium oxide in the form of a thin film.

Example 2-2

A solid titanium oxide in the form of a thin film was obtained in the same manner as in Example 2-1, except that, as the first liquid L1, a hexane solution containing 30% by mass of $Ti(OBu)_4$ serving as an inorganic oxide precursor was used.

Example 2-3

A solid titanium oxide in the form of a thin film was obtained in the same manner as in Example 2-2, except that the flow rate $Q_2$ of the second liquid L2 was 300 mL/min, the linear velocity $u_2$ of the second liquid L2 was 0.016 m/s, and the Reynolds number $Re_2$ of the second liquid L2 was 7.6, and furthermore, the segment size $S_1$ of the first liquid L1 was 6.8 μm and the segment size $S_2$ of the second liquid L2 was 3100 μm, and furthermore, the duration of contact (duration of reaction) between the first liquid L1 and the second liquid L2 was 9 seconds.

TABLE 3

| | | Example | | |
|---|---|---|---|---|
| Second Example | | 2-1 | 2-2 | 2-3 |
| First Liquid | Solvent | Hexane | Hexane | Hexane |
| | Inorganic Oxide Precursor | Ti(OBu)$_4$ | Ti(OBu)$_4$ | Ti(OBu)$_4$ |
| | Inorganic Oxide Precursor Content $c_1$ (% by mass) | 5.0 | 30 | 30 |
| | Segment Size $S_1$ (μm) | 9.2 | 9.2 | 6.8 |
| | Flow Rate $Q_1$ (mL/min) | 0.66 | 0.66 | 0.66 |
| Second Liquid | Solvent | EmimES | EmimES | EmimES |
| | Inorganic-oxide-forming Substance | Water | Water | Water |
| | Inorganic-oxide-forming Substance Content $c_2$ (% by mass) | 10 | 10 | 10 |
| | Segment Size $S_2$ (μm) | 2800 | 2800 | 3100 |
| | Flow Rate $Q_2$ (mL/min) | 200 | 200 | 300 |
| | Linear Velocity $u_2$ (m/s) | 0.012 | 0.012 | 0.016 |
| | Reynolds Number $Re_2$ | 5.1 | 5.1 | 7.6 |
| Interfacial Tension of First Liquid to Second Liquid (mN/m) | | 19.3 | 19.3 | 19.3 |
| $m_2/m_1$ (Molar Movement Rate Ratio) | | 20485 | 3035 | 4553 |
| $S_2/S_1$ | | 304 | 304 | 456 |
| Reactor | | Liquid Tank FIG. 3 | Liquid Tank FIG. 3 | Liquid Tank FIG. 3 |
| Reaction Temperature (° C.) | | 25 | 25 | 25 |
| Contact Duration (Reaction Duration) (s) | | 13 | 13 | 9 |
| Metal Oxide Form | | Thin Film Form | Thin Film Form | Thin Film Form |
| Average Thickness (μm) | | 0.29 | 0.40 | 0.45 |

Third Example

Figure 16:
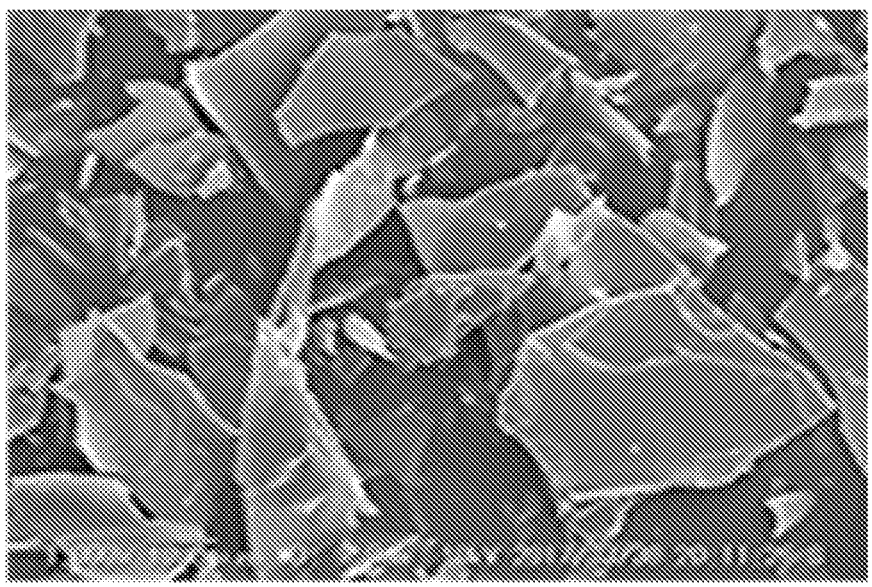
FIG. 16 is a photograph of the titanium oxide obtained from Third Example observed using a microscope.

Using the belt-conveyor system 60 as illustrated in FIGS. 6A and 6B and FIGS. 7A and 7B, the first liquid L1 and the second liquid L2 were brought into contact with each other by continuous operation to produce a titanium oxide in the form of a thin film in the following Example 3 as shown in FIG. 16. Using a Wilhelmy type interfacial tensiometer, an interfacial tension of the first liquid L1 to the second liquid L2 at 25° C. was measured. Furthermore, the average thickness of the obtained titanium oxide in the form of the thin film was determined in the same manner as in First Example. Table 4 shows the results, and FIG. 16 shows the obtained titanium oxide.

Example 3

As the first liquid L1, a hexane solution containing 30% by mass of Ti(OBu)$_4$ serving as an inorganic oxide precursor was prepared. Furthermore, as the second liquid L2, an ionic liquid solution containing 10% by mass of water serving as an inorganic-oxide-forming substance and having Emim cations and ES anions was prepared.

The second liquid L2 was supplied into recesses 63 in a conveyor belt 62 that was moving while being wound around a pair of rollers 61, and thereby transported, and the first liquid L1 was supplied onto the surface of the second liquid L2 to form a liquid laminated structure, whereby a slurry containing a titanium oxide gel in the form of a thin film was obtained. At this time, the segment size $S_1$ of the first liquid L1 and the segment size $S_2$ of the second liquid L2 at the time of contact between the first liquid L1 and the second liquid L2 are 2 μm and 4000 μm, respectively, which are respectively equivalent to layer thicknesses at the cross-sections perpendicular to the flow direction of the liquids in a state in which the liquid laminated structure is formed by supplying the first liquid L1 onto the surface of the transported second liquid L2. The transport rate $Q_2$' of the second liquid L2 was 120 mL/min. The transport rate $Q_1$' of the first liquid L1 was 0.06 mL/min. The temperature (reaction temperature) of the first liquid L1 and the second liquid L2 was 25° C. The duration of contact (duration of reaction) between the first liquid L1 and the second liquid L2 was 10 seconds.

The obtained slurry was filtered using a metal mesh, and the titanium oxide gel in the form of the thin film remaining on the metal mesh was washed with ethanol, and subsequently dried and baked to obtain a solid titanium oxide in the form of a thin film.

TABLE 4

| Third Example | | Example 3 |
|---|---|---|
| First Liquid | Solvent | Hexane |
| | Inorganic Oxide Precursor | Ti(OBu)$_4$ |
| | Inorganic Oxide Precursor Content $c_1$ (% by mass) | 30 |
| | Segment Size $S_1$ (μm) | 2 |
| | Transport Rate $Q_1$' (mL/min) | 0.06 |
| Second Liquid | Solvent | EmimES |
| | Inorganic-oxide-forming Substance | Water |
| | Inorganic-oxide-forming Substance Content $c_2$ (% by mass) | 10 |
| | Segment Size $S_2$ (μm) | 4000 |
| | Transport Rate $Q_2$' (mL/min) | 120 |
| Interfacial Tension of First Liquid to Second Liquid (mN/m) | | 19.3 |
| $m_2/m_1$ (Molar Movement Rate Ratio) | | 20107 |
| $S_2/S_1$ | | 2000 |
| Reactor | | Belt-conveyor System FIGS. 6, 7A to 7B |
| Reaction Temperature (° C.) | | 25 |
| Contact Duration (Reaction Duration) (s) | | 10 |
| Metal Oxide Form | | Thin Film Form |
| Average Thickness (μm) | | 0.47 |

INDUSTRIAL APPLICABILITY

The present invention is useful in the technical field of methods for producing an inorganic oxide in the form of a thin film.

The invention claimed is:

1. A method for producing an inorganic oxide in a form of a thin film, the method comprising
   providing a stream of a first liquid having an inorganic oxide precursor dissolved therein,
   providing a separate stream of a second liquid having a substance dissolved therein, the substance reacting with the inorganic oxide precursor of the first liquid to form an inorganic oxide derived from the inorganic oxide precursor, and
   bringing said first liquid and said second liquid into contact with each other,
   wherein a segment size of a cross-section perpendicular to a flow direction of the first liquid at a time of contact between the first and second liquids is maintained at 500 μm or smaller, thereby providing an inorganic oxide in the form of a thin film having an average thickness of 0.01 μm or larger and 1.5 μm or smaller.

2. The method of claim 1, wherein
the bringing the first liquid and the second liquid into contact with each other is performed by continuous operation.

3. The method of claim 2, wherein
a mode of contact between the first and second liquids includes a mode of supplying moving one of the first and second liquids with another to bring the first and second liquids into contact with each other.

4. The method of claim 3, wherein
the mode of contact between the first and second liquids includes a mode of supplying transported one of the first and second liquids with another to bring the first and second liquids into contact with each other.

5. The method of claim 3, wherein
the mode of contact between the first and second liquids includes a mode of supplying flowing one of the first and second liquids with another to bring the first and second liquids into contact with each other.

6. The method of claim 5, wherein
the mode of contact between the first and second liquids includes a mode of allowing both of the first and second liquids to flow and join together.

7. The method of claim 6, wherein
a manner of supplying one of the first and second liquids with another is a manner of allowing both of the first and second liquids to flow out of slits and join together.

8. The method of claim 6, wherein
the mode of contact between the first and second liquids includes a mode of allowing both of the first and second liquids to flow in a same flow direction, and, while maintaining the flow direction, bringing the first and second liquids into contact with each other.

9. The method of claim 8, wherein
the manner of supplying one of the first and second liquids with another is a manner of allowing the one to flow between an inner pipe and an outer pipe of a double pipe while allowing the other to flow through the inner pipe, and causing the one and the other to join together so as to cover the other with the one.

10. The method of claim 6, wherein
when both of the first and second liquids are allowed to flow, a ratio of a linear flow velocity of the first liquid to a linear flow velocity of the second liquid at a time of contact between the first liquid and the second liquid is 0.01 or more and 100 or less.

11. The method of claim 1, wherein
the inorganic oxide precursor includes a metal alkoxide.

12. The method of claim 1, wherein when the second liquid is allowed to flow, a Reynolds number of the second liquid until a time when the first and second liquids come into contact with each other is 0.01 or more and 500 or less.

13. The method of claim 1, wherein
a segment size of the second liquid at the time of contact between the first liquid and the second liquid is 5 mm or smaller.

14. The method of claim 1, wherein
a ratio of the segment size of the second liquid to the segment size of the first liquid at the time of contact between the first and second liquids is 0.1 or more and 500 or less.

15. The method of claim 1, wherein
a solvent of the first liquid includes one or two or more of toluene, hexane, heptane, benzene, and chloroform.

16. The method of claim 1, wherein
an interfacial tension of the first liquid to the second liquid at a temperature at the time of contact between the first liquid and the second liquid is 0.1 mN/m or more and 30 mN/m or less.

17. The method of claim 1, wherein
a duration of contact between the first and second liquids is 0.5 sec or longer and 600 sec or shorter.

18. The method of claim 1, wherein
a reaction temperature at the time of contact between the first and second liquids is 10° C. or higher and 60° C. or lower.

19. The method of claim 1, wherein
a ratio of an average longitudinal diameter to the average thickness of the inorganic oxide in the form of the film is 5 or more and 2000 or less.

20. The method of claim 1, wherein
a content of the inorganic oxide precursor in the first liquid is 1% by mass or more to 80% by mass or less.

21. The method of claim 1, wherein
a content of the substance in the second liquid to form the inorganic oxide is 0.1% by mass or more to 70% by mass or less.

22. The method of claim 1, wherein
a solvent of the second liquid includes at least one of ionic liquids, acetonitrile, and dimethyl sulfoxide.

23. A method for producing an inorganic oxide in a form of a thin film, the method comprising
providing a stream of a first liquid having an inorganic oxide precursor dissolved therein, providing a separate stream of a second liquid having a substance dissolved therein, the substance reacting with the inorganic oxide precursor of the first liquid to form an inorganic oxide derived from the inorganic oxide precursor, and
bringing said first liquid and said second liquid into contact with each other,
wherein a segment size of a cross-section perpendicular to a flow direction of the first liquid at a time of contact between the first and second liquids is maintained at 500 µm or smaller, thereby providing an inorganic oxide in the form of a thin film, and
wherein a ratio of an average longitudinal diameter to the average thickness of the inorganic oxide in the form of the film is 5 or more and 2000 or less.

* * * * *